US006653640B2

(12) United States Patent
Kulish et al.

(10) Patent No.: US 6,653,640 B2
(45) Date of Patent: Nov. 25, 2003

(54) MULTICHANNEL LINEAR INDUCTION ACCELERATOR OF CHARGED PARTICLES

(76) Inventors: Victor V. Kulish, 55 Kosmonavitv Prospect Apt 13, Sumy (UA), 244035; Alexandra C. Melnyk, 801 Bovee La., Powell, OH (US) 43065

(*) Notice: Subject to any disclaimer, the term of this patent is extended or adjusted under 35 U.S.C. 154(b) by 175 days.

(21) Appl. No.: 10/020,264

(22) Filed: Dec. 18, 2001

(65) Prior Publication Data

US 2002/0109472 A1 Aug. 15, 2002

(30) Foreign Application Priority Data

Feb. 13, 2001 (UA) ........................................ 2001020957

(51) Int. Cl.$^{7}$ ............................ H01J 25/10; G01K 1/08

(52) U.S. Cl. ............................. 250/491.1; 250/396 R; 250/396 ML; 250/397; 315/5.41; 315/13; 315/39

(58) Field of Search ..................... 250/396 R, 396 ML, 250/397, 398, 491.1, 492.1, 492.2, 505.1, 515.1; 315/5.41, 13, 39

(56) References Cited

U.S. PATENT DOCUMENTS 3,956,634 A * 5/1976 Tran et al. .............. 250/396 R
4,058,730 A * 11/1977 Meyer et al. ............... 250/397
4,667,111 A * 5/1987 Glavish et al. .......... 250/492.2
4,780,647 A * 10/1988 Friedman et al. .......... 315/5.41
5,336,972 A * 8/1994 Sheffield et al. ........... 315/5.41
5,412,283 A * 5/1995 Tronc ........................ 315/5.41
5,440,203 A * 8/1995 Nakanishi .................. 315/5.41
5,729,028 A * 3/1998 Rose ...................... 250/492.21
5,914,492 A * 6/1999 Wang et al. ................ 250/397
6,580,084 B1 * 6/2003 Hiramoto et al. ........ 250/505.1

* cited by examiner

*Primary Examiner*—John R. Lee
*Assistant Examiner*—David A. Vanore
(74) *Attorney, Agent, or Firm*—Mueller and Smith, LPA

(57) ABSTRACT

A linear induction accelerator, comprised of an injector block, acceleration block, the outlet device, and a drive source. The acceleration block is made from not less than two electrodynamically bound acceleration blocks of the single-channel linear induction accelerators, which are mutually oriented in such way that the direction of the electric field in any of the working channel is opposite to the electric field direction at least in one of the neighboring single-channel blocks of the single-channel linear induction accelerators. The invention allows a decrease of the real dimensions of the accelerator structure, increase of the electromagnetic compatibility level, technology and user safety, and a simplification of structure.

18 Claims, 36 Drawing Sheets

MULTICHANNEL LINEAR INDUCTION ACCELERATOR OF CHARGED PARTICLES

BACKGROUND OF THE INVENTION

The invention belongs to the acceleration engineering, especially to the linear induction accelerators of charged particles and might be used as a commercial-type compact accelerator for the formation of singular and multiple parallel relativistic beams, including beams of different energy and charge signs.

There is known a devise (electrostatic accelerator-EA), which is able to work as an accelerator of charged particles (Cockcroft J. D., Walter E. T. C. "Experiments with high velocity ions. Further developments in the method of obtaining high velocity positive ions." Proc. Roy. Soc. A, vol. 136, p 619, 1932.) The devise is composed of an injector block, acceleration block, drive source, and output devise. The basic shortcomings of EA are excessive dimensions, high cost, high operational danger and low beam (or beams) current of accelerated charged particles. All the mentioned shortcomings are caused by the structural peculiarity of drive source, having components under hundreds of thousands to million (and in many cases higher than that) volts. High-pressure (from 5 to 30 atmosphere) gases and special electro-technical oils are used for securing the isolation of these components. This makes the operation of such accelerators dangerous and makes impossible to fabricate small-dimension and simultaneously powerful accelerating systems. The mentioned above shortcomings are the basic hindrance for the formation of the compact, inexpensive, and safe in operation commercial-type devises (accelerators) for generation of the singular and multiple parallel beams of charged particles, including such that have beams of different energy and of different charge sign. These shortcomings become especially substantial at work with >1 MeV electron beams.

A linear induction accelerator, which can work as a compact devise for formation of singular relativistic beams of charged particles is also known (Redinato L. "the advanced test accelerator (ATA), a 50 MeV, 10 kA Inductional Linac", *IEEE Trans*., NS-30, No.4 pp. 2970–2973, 1983). This devise is known also as single-channel linear induction accelerator (SLIA). Like the EA accelerator, SLIA contains injector block, accelerator block, drive source and output device. Its peculiarity is in that the accelerating block has the form of an inductor with one working channel for acceleration of charged particles. The acceleration of charged particles in SLIA is achieved by the effect of the longitudinal vortex electric field, having relatively low frequency (tens MHz), which is generated in the working channel of the inductor by special windings, having changing in time current. The inductor contains cores, made of high-frequencies magnetic materials with an elevated electric strength, made of ferrites, amorphous magnetic materials, etc. Because of this, SLIA does not have the shortcoming of the EA, which requires super-high potential difference in construction of elements of the working (accelerating) channel. This makes SLIA more operation safe. In contrast to EA, much more strong (including many amper and also kiloamper) beams of charged particles can be accelerated in SLIA.

The basic shortcoming of SLIA is, that during its performance, a strong external vortex electric field can be generated in its surrounding. (In contrast to the external, a vortex electric field in the acceleration (working channel is classified as the internal field; in contemporary SLIA, the potential of the internal field might reach tens MV/m). In uncommon situations, or in a case of improper operation, the external vortex electric field may be dangerous for the operating personnel as well as for the surrounding apparatuses when they are not properly screened. In other words, SLIA has a low level of electromagnetic compatibility. The other side of the problem of the electromagnetic compatibility consists of that the presence of the presence of a strong external field leads to the formation of a peculiar "dead zone", work in which demands special means of protection. This limits the possibility of using the space directly surrounding the accelerating block of SLIA. The latter can be considered that the real dimensions, e.g. transversal dimensions, of SLIA might be significantly larger than the transversal dimensions of the accelerating block. The dimensions of the space surrounding SLIA beyond which the intensity of the external vortex electric field decreases to some accepted value is called the working dimension of SLIA. It is clear; the higher is the intensity of the internal electric field in the accelerating channel the larger is the working dimension of the system. Consequently, a principal contradiction exists in the structural concept of SLIA between the effort to increase the tempo of the acceleration by the way of an increase of the internal vortex electric field and the simultaneous increase of the working dimension of the system.

The use of especial metallic screens is the basic technologic solution, which secures a decrease of the external electric field in SLIA. The weakening of the external field is achieved by the organization of the additional field-energy losses in the volume of the screen.

A radical decrease of the strength of the external electric field by this method was practically not achieved. In some structures the metallic screens serve also as the elements of the conducting circuit, used to form a difference in voltage in the acceleration space (Pasour J. A., Lucey R. F., Robertson C. W. Long pulse free electron laser driven by a linear induction accelerator, *Proc. SPIE*, v. 453, pp. 328–331, 1984).

In addition to the above, the energy, which is used for generating the external electric field in SLIA, is comparable to the energy used for the generation of the internal field in the working channel. It means, that the efficiency coefficient of SLIA cannot be high. This is also one of the basic shortcomings of this class of structures.

The large real (working) dimensions and the necessity to apply safety measures result in high price of fabrication and of operation of SLIA. This leads to the conclusion that use of SLIA, as the key construction element, for various type commercial application devises is unsuitable. Besides this, the above-described characteristics of SLIA are incompatible with the traditional technologic culture, which is typical in civil (common) industry, e.g. light, food, pharmaceutical industry, inc.

Consequently, the presence of a strong external vortex electric field (and related with it the low electromagnetic compatibility and large energy losses) is the basic factor causing the basic shortcomings of SLIA. It causes an elevated danger in operation, large working dimensions, and complexity of construction, low efficiency coefficient, expensive manufacturing and technologic incompatibility with the typical conditions present in civil industry.

The functional limitation is the other essential shortcoming of SLIA. Each separately taken SLIA cannot be used for an independent simultaneous acceleration of a few beams of charged particles, including such which differ in charge sign of particles.

The given devise is the most similar in technical essence and in the obtained results to the proposed invention and is considered as the prototype of the invention.

BRIEF SUMMARY OF THE INVENTION

The aim of the invention is to create a commercial-type linear induction accelerator, which has wider functional abilities (for instance, the ability to accelerate simultaneously a few beams of charged particles, including particles having different charge sign), realistic compatibility, high degree of electromagnetic compatibility and efficiency coefficient, operational safety, low manufacturing cost, simple structure, and high technology (it means, a technology which is adequate to the typical conditions in the civil industry). This is achieved by improving the structure of the inductor of the accelerator block this allows to decrease drastically the strength of the external electric field. The proposed invention is called the multi-channel induction accelerator (MLIA).

The arising task is solved as follows: according to the invention, in the multi-channel induction accelerator (which encompasses an injector block, accelerating block, drive source, and output devices for the linear beams of charged particles) the accelerating block has a form of at least two electrodynamically linked blocks of one-channel linear induction accelerators, or one-channel accelerating blocks, which have output devices for linear beams of charged particles attached to the output of the linked accelerating block. They are oriented in such way that the electric-field direction of the working channel of each of the one-channel accelerating block is opposed to the direction of the field of at least one of the neighboring one-channel accelerating blocks.

The arising task is solved as follows: according to the invention, in the multi-channel induction accelerator (which encompasses an injector block, accelerating block, drive source, and output devices for the linear beams of charged particles) the accelerating block has a form of at least two electrodynamically linked blocks of one-channel linear induction accelerators, or one-channel accelerating blocks, which have output devices for linear beams of charged particles attached to the output of the linked accelerating block. They are oriented in such way that the electric-field direction of the working channel of each of the one-channel accelerating block is opposed to the direction of the field of at least one of the neighboring one-channel accelerating blocks.

In addition to this, four structural variants are proposed for linking of the accelerating blocks with the injection block:

In the first variant, the injection block has a form of one injector of charged-particle beams which is attached to one of the accelerating blocks in such way that electric field in the working channel is accelerating for the charged particles of the injector, which is attached to it and oriented in opposite direction to the field direction in all the remaining neighboring with this block one-channel linear induction accelerators.

In the second variant, the injection block has is made in a form of a system of the same sign charged-particles injectors attached to a part of the one-channel accelerating blocks from one and the same side. Beside this, all the one-channel acceleration blocks are attached to injectors in the way that the electric field in each of the one-channel accelerating blocks is accelerating for the charged particles of the injector, which is attached to them.

In the third variant, the injection block has a form of two smaller injection blocks of beams of the same-charge particles, each of them is placed facing the opposite ends of the working channels of the one-channel accelerating blocks. The injectors are attached to the working channels in such way that the electric field in each of the one-channel accelerating block is accelerating for the charged particles of the injector, which is attached to it.

In the fourth variant, the block of injectors is made of two smaller blocks, each of which is a sub-block of injection of different-sign charged-particle beam. These injectors are attached, from one and the side, to the one-channel accelerating blocks. Each of the one-channel accelerating block, which has an injector attached to it, has the acceleration direction in the working channel of the type of the charged particles which are generated by the attached injector.

Besides this, in each of the four variants, four variants of mutual orientation are proposed for the accelerating blocks of the one-channel linear induction accelerators.

In the first case of the mutual orientation, the accelerating block is made in such way that the axis of the working channels of the one-channel linear induction accelerators are parallel; it means they do not cross.

In the second case, the accelerating block is built in the way that the axis of the working channels of the accelerating blocks of the one-channel linear induction accelerators are not parallel and are crossing in one point.

In the third case, the accelerating block is built in such way that the axis of the working channel of the acceleration blocks of the one-channel linear induction accelerators are not parallel and do not cross.

In the fourth case, the acceleration block is built in such way that the axis of the working channels of the accelerating blocks of the one-channel linear induction accelerators are not parallel and have different axis crossing in various places.

Building of the multi-channel linear induction accelerator of charged particles, totally with all the essential characteristics, including above described different structural variants of the accelerator block as well of the schemes in forming of this block with the injector block, allows to realize a situation when the external vortex electric fields of all one-channel linear induction accelerators, beyond the limits of their working channels mutually cancel each other (it means, they are of the opposite signs), when within the volume of the working channel of the one-channel linear induction accelerators they are of the sign. Consequently, the external electric field of the MLIA decreases drastically as function of distance from the MLIA external surface. Because of it, their operation becomes markedly more safe, the working dimensions decrease (the dimensions of the "dead zone" decrease), the real dimensions of the accelerator decrease, the structure is simplified, and this opens the possibility of the accelerator's commercial application in the conditions, typical to the civil industry conditions.

Patent search for devises with the similar characteristics were not detected and also the information was not found (by the search) about the effects, foreseen by the essential evidence of the invention for obtaining the described technical result. This allows concluding that the declaration of the technical solution corresponds to the criterion of patentable "novelty" and to the "invention level."

BRIEF DESCRIPTION OF THE DRAWINGS

The essence of the invention is explained by figures, where in FIG. 1 is presented the structure of the electric scheme of multi-channel linear induction accelerator (MLIA)

DETAILED DESCRIPTION

Figure 1:
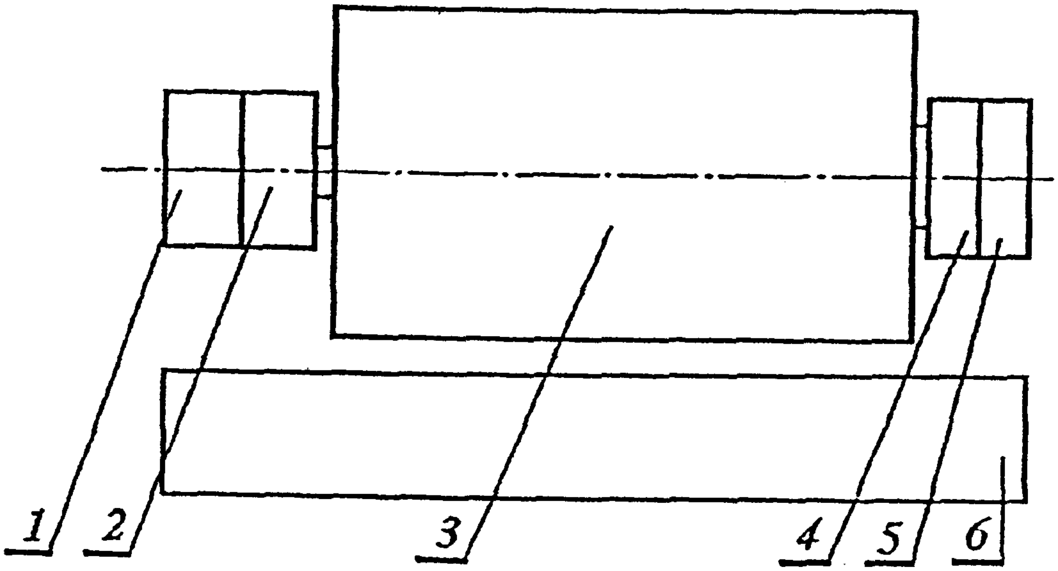

The multi-channel linear induction accelerator MLIA has the frontal parts of the injector block I and of the block of outlet devise for the linear beams of charged particles (of output block) 2. The frontal part is attached to the multi-channel acceleration block 3. The rear parts of injector block 4 and outlet block 5 are attached to acceleration block 3 from the opposite side. The parts of the injector block 1, 4, of the outlet block 2, 5, and the acceleration block are attached to the drive source block 6. The injector block is composed of not less that one injector of charged particles and the outlet block of not less that one outlet devices. It should be mentioned that a simultaneous presence of the frontal 1, 2 and the rear 4, 5 parts of the injector and outlet blocks, respectively, is not necessary for the all structural variants of MLIA. In different structural variants, at least one of the above mentioned elements could be absent. However, in any structural variant there has to be at least one injector and one outlet devise simultaneously.

Figure 2:
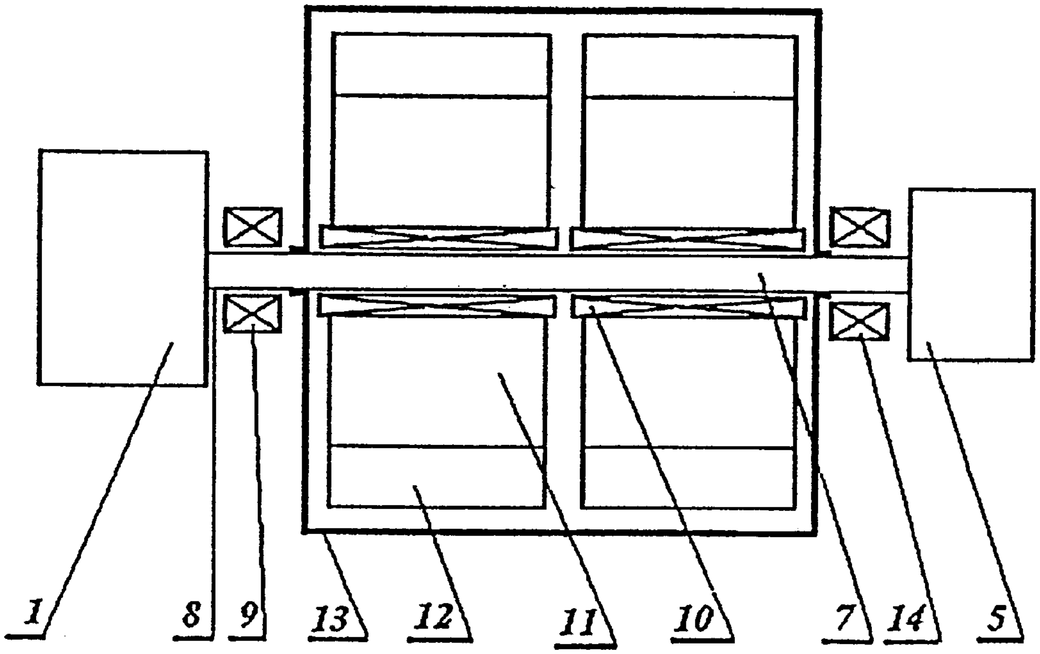
in FIG. 2 is given the structure of the MLIA structural variant having a few peripheral channels to which the injectors are not attached and one central channel which has dielectric walls and attached one injector of charged particles.
Figure 3:
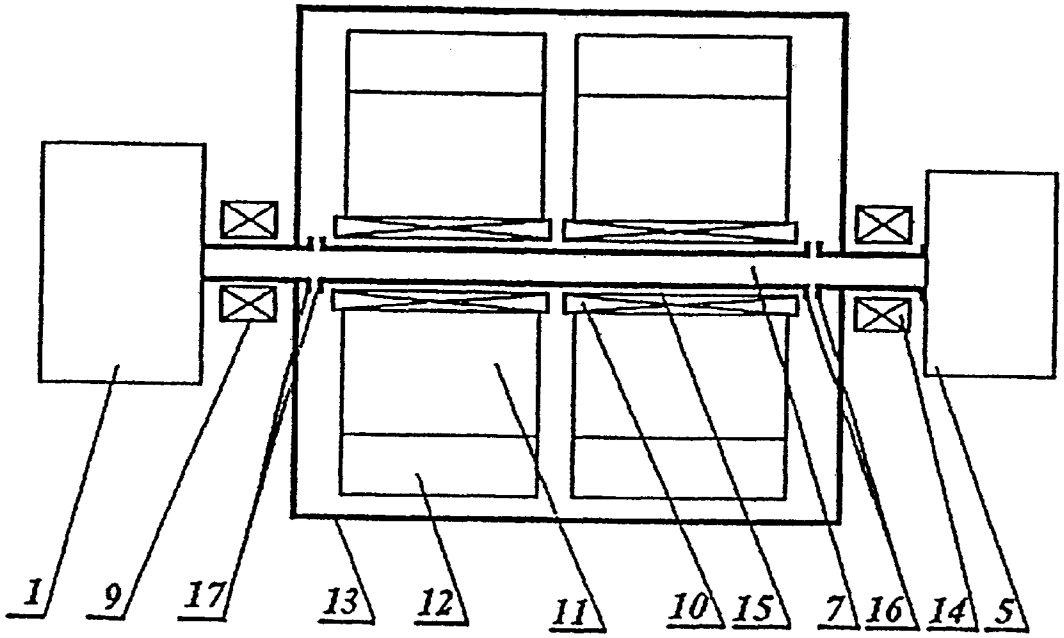
FIG. 3 illustrates an analogous construction in which the walls of the central channel are prepared from a conductor material.

The last statement is illustrated in FIG. 2 and FIG. 3. Among them, the FIG. 2 shows a MLIA having only one channel (the central channel) used as the accelerating channel. All other channels (the peripheral channels) are used only for quenching of the external electric fields and for the amplification of the field in the central channel. Here the injector 1 of a charged particles beam is attached to the central acceleration channel 7, the walls of which (tube of the acceleration channel) 8 are made from a dielectric non-magnetic material. The transport of a charged-particle beam is provided by a focusing and correction system 9, which is made in the form of a solenoid or a system of magnetic lenses. The accelerating channel 7 is encompassed by systems of the focusing and correction of the accelerating charged-particle beam 10, which in turn are encompassed by the central inductors (by accelerating block of SLIA) 11. The inductors 11 are encompassed by the peripheral inductors (by accelerating blocks of SLIA) 12. The whole accelerating block of MLIA 3 is allocated in a metallic screen 13. The system of focusing and correction of the charged-particle beam 14 is located at the outlet of the acceleration channel 7, having the outlet block is attached to it.

The FIG. 3 shows an ideally analogous structural version. Only the form of the central tube 15, which encompasses the acceleration channel 7, is different in form. Here the tube is made from a conducting material and has two characteristic ruptures 16 and 17, respectively. These ruptures are called the accelerating interspaces.

Figure 4:
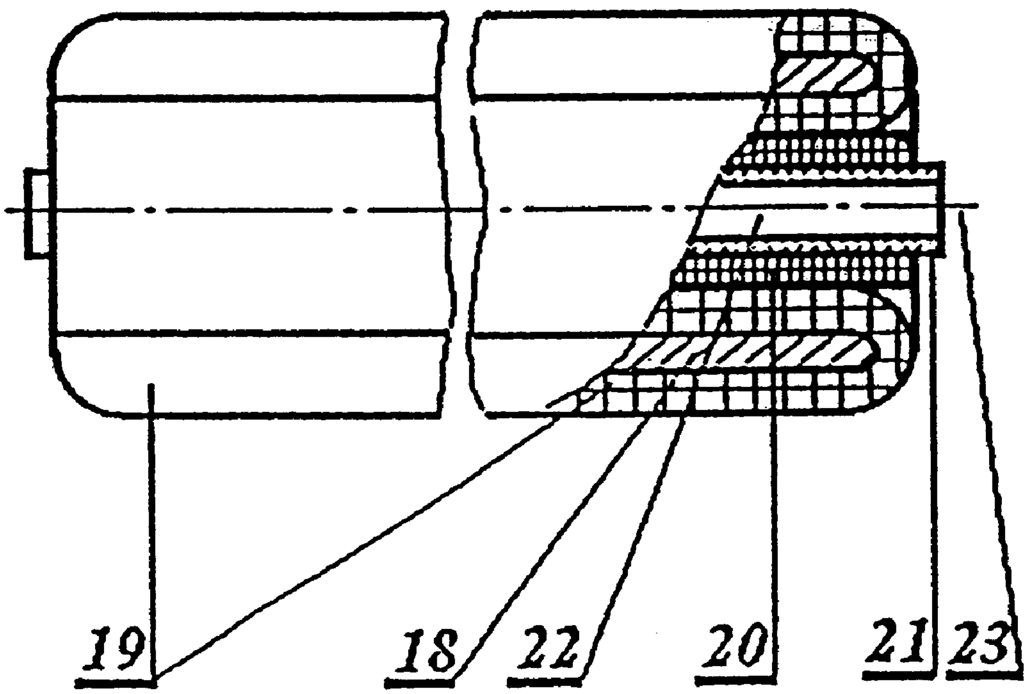
FIG. 4 illustrates a one-layer structure of the accelerator block of SLIA (front projection), in which the magnetic core id made in a form of a compact cylindrical tube.

As it was mentioned before, in the provided invention, it is proposed to build the accelerating blocks of MLIA from certain way oriented acceleration blocks of SLIA. The FIG. 4 shows the frontal projection of the structure of such acceleration blocks. Here, the, magnetic core 18, which has a form of a tube and is made from a ferrite or an amorphous magnetic material, has wires 19 reeled on it in the longitudinal direction. A focusing solenoid 20 is placed in the central part of the core 18 having reels 19. The solenoid encompasses the tube of the acceleration channel 22 of SLIA. The tube 21 is oriented along the axis of the channel 23.

Figure 5:
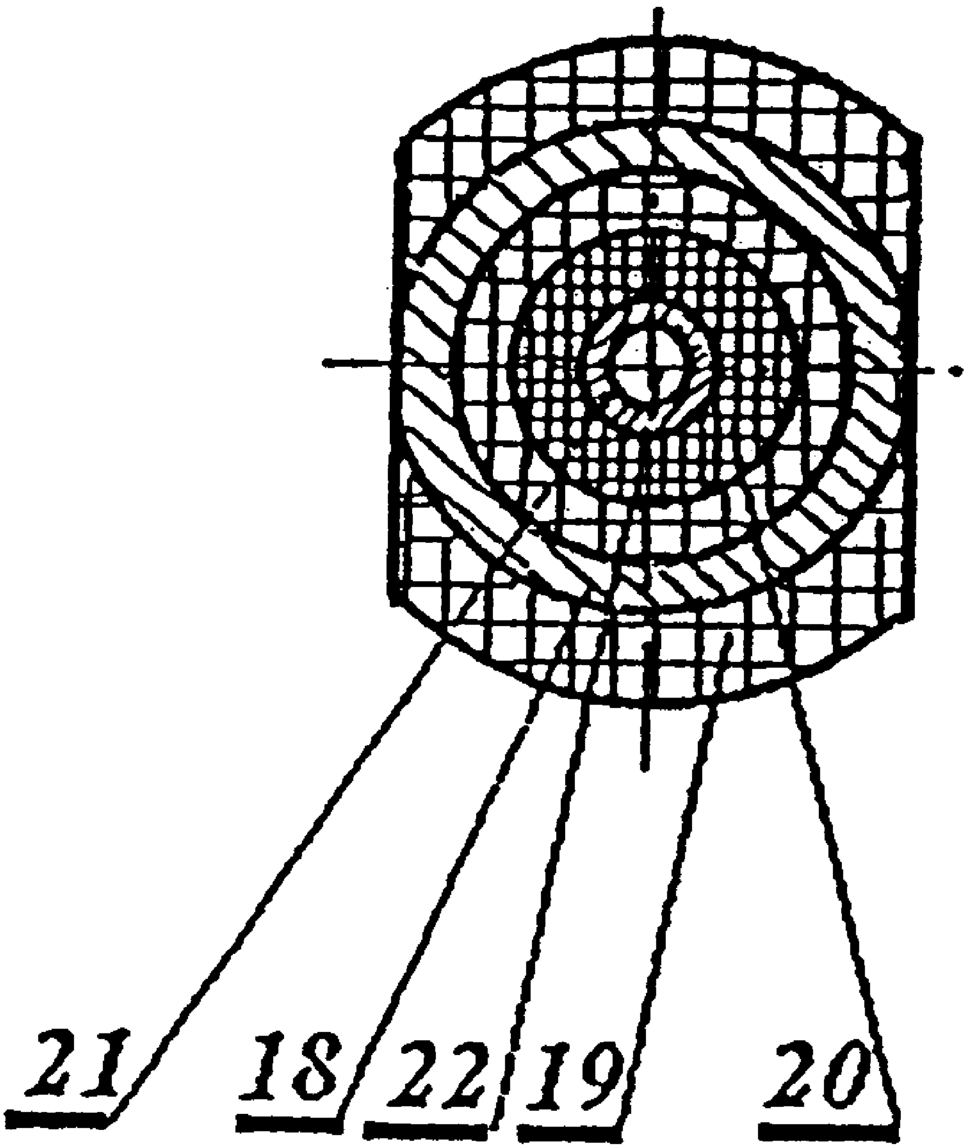
FIG. 5 is the transverse cross-section of the latter structure.

The FIG. 5 shows a transversal cross-section of this structure. Here all the positions are the same as those on FIG. 4.

Figure 6:
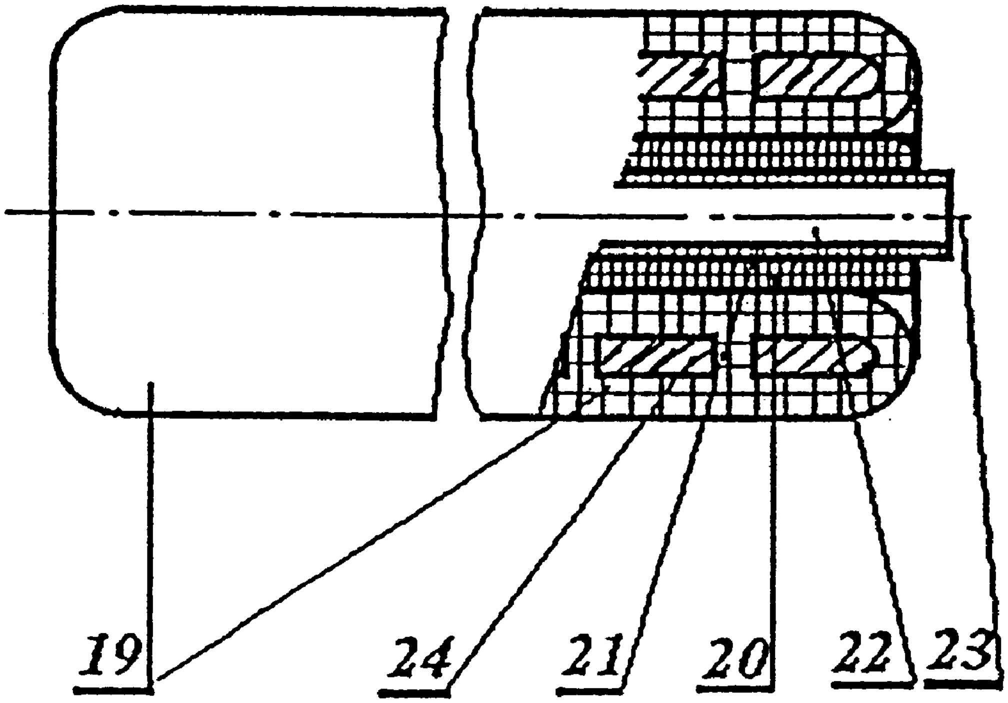
in FIG. 6 a one-layer structure (front projection) of the acceleration block of SLIA is presented in which the magnetic core had a form of a sequence of rings.

The FIG. 6 shows an example of a different structural variant of the acceleration block of SLIA. The difference in structure, as compared with FIGS. 4 and 5, is in the form of the magnetic core. Here, the magnetic core 24 has a form of a sequence of rings (short tubes), placed one on the in the same longitudinal axis 23. Each of the rings has wire reels 19. This structural variant is most popular in practice, since it secures the possible minimal value of the high-frequency voltage feeding on the wire reels 19. There are known also the structural variants in which the rings 24 are distributed in the way that they form an electrodynamically continuous cylindrical core, similar to that in FIG. 18. In such cases the wire reels 19 are reeled on this compiled cylindrical core as it is reeled on a continuous core.

Figure 7:
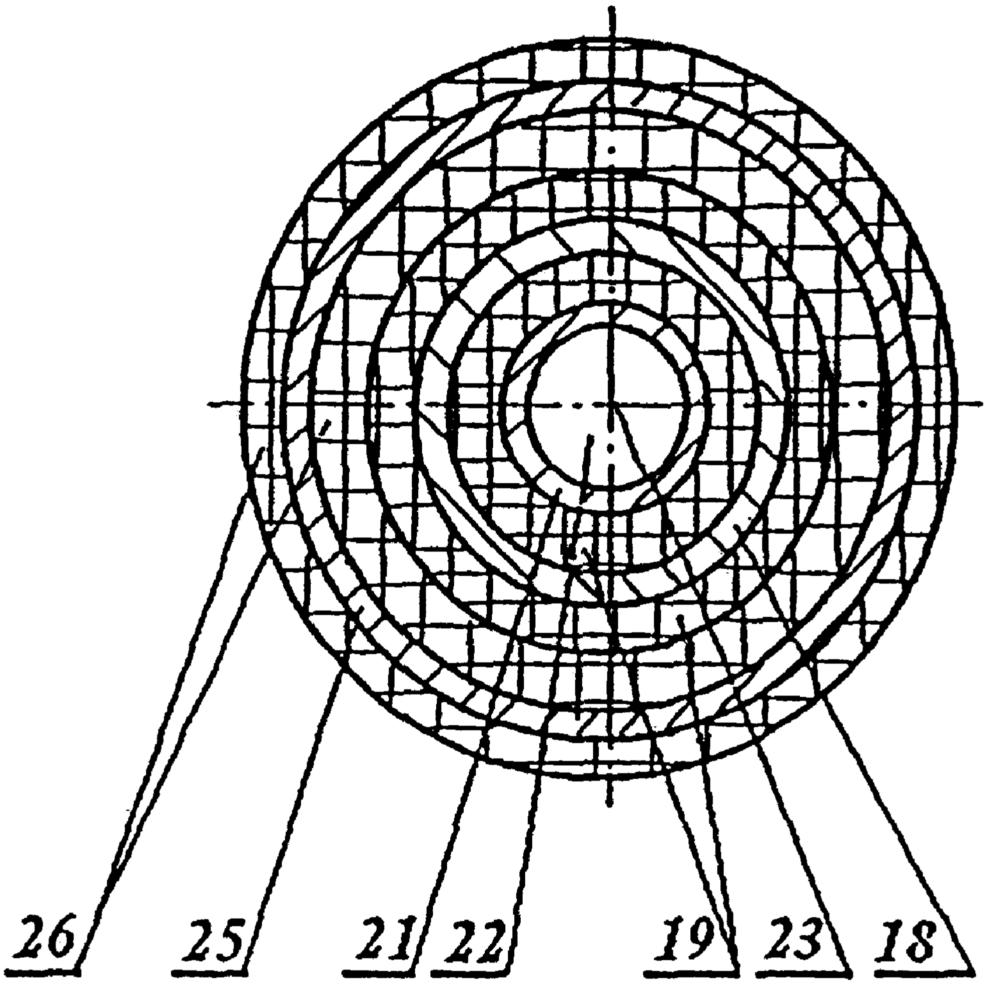
in FIG. 7 a two-layer structure (transverse projection) of the acceleration block of SLIA is shown and has the form of the coaxially placed magnetic cores which are having wire windings: in 8 FIG. shows a one-layer structure of the acceleration block of SLIA (isometrics) in which the magnetic core has a form of a tube of a rectangular cross-section.

The structures, illustrated in FIG. 4 to FIG. 6, all are made as monolayer structures. It means that the cumulatively the magnetic core and reels structurally form only one layer. Also the accelerating blocks of MLIA are proposed which are composed of a few coaxially distributed acceleration blocks of SLIA. Each of these multilayer blocks is composed from not less than two single-layer blocks of SLIA, which are assembled coaxially. That is, the blocks of a smaller diameter are encompassed by the blocks of a larger diameter in such way that the symmetry axis of all the single-layer blocks coincide with the axis of the acceleration channel. This structure is illustrated in FIG. 7. Here, the magnetic core 18 (which has a smaller diameter) with reels 19 on its surface forms an internal one-layer accelerating block SLIA. Correspondingly, the magnetic core 25 and the reels 26 form an external one-layer block. Both the one-layer blocks are allocated coaxially, making their symmetry axis and the longitudinal axis 23 of the acceleration channel 22 coincide. The peculiarity of this type multi-layer structure variant is that the wire reels of the external layer (or a few external layers) are in contact with the drive source 6 in the way that the alternating electric current flows in them in an opposite direction that the current direction in reeled wires of the internal layers.

Figure 8:
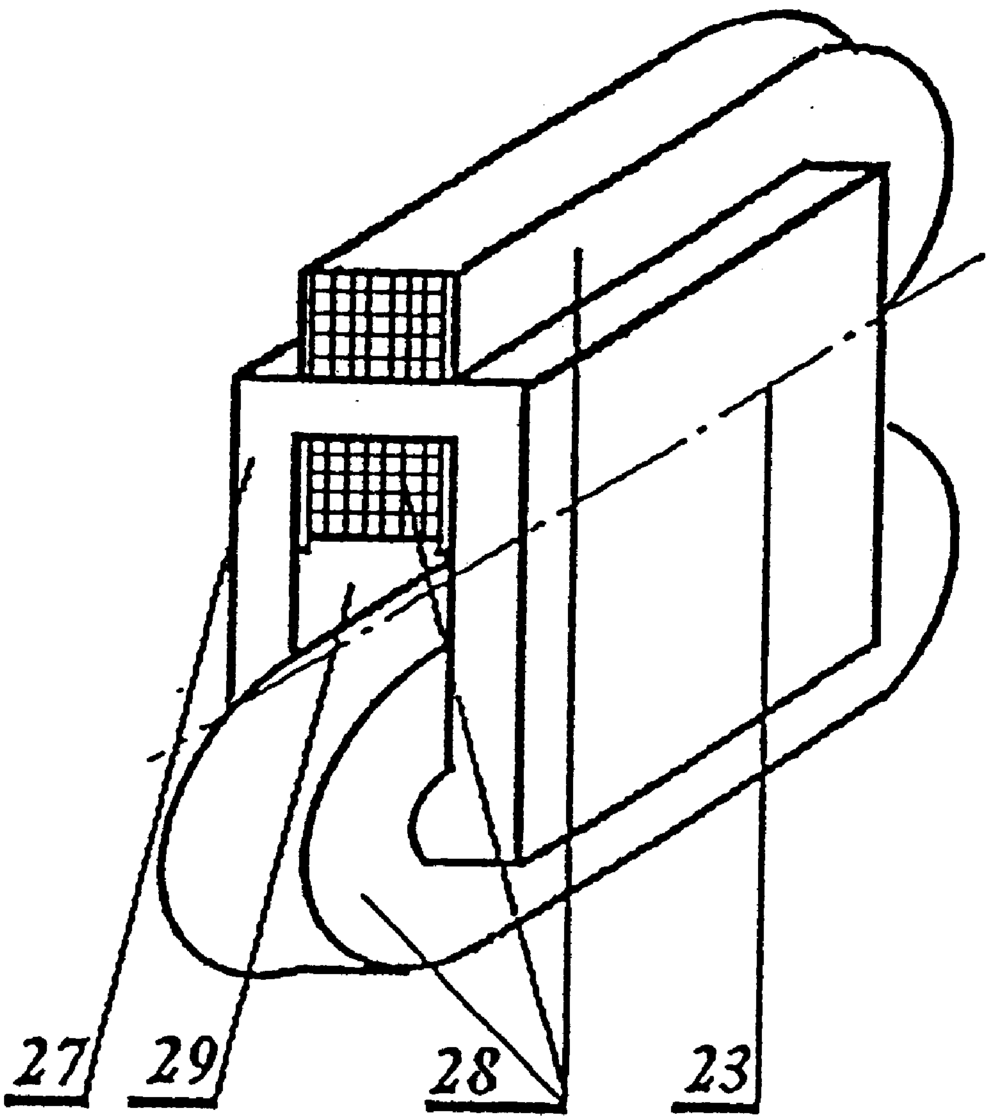

The peculiarity of the structures illustrated by FIG. 4 to FIG. 7 is that they are constructed on the basis of the cylindrical (or ring-like) magnetic cores with a circular cross section. Also the MLIA are proposed which are built on the basis of SLIA structures by using cores with rectangular, hexagonal, etc. cross section. The FIG. 8 shows an example of such structure having rectangular cross section of the magnetic core. The sidewalls of the magnetic core, which as it was mentioned before has a rectangular cross section, have wire reels 28. The central part of the core 27, which does not have reels, serves as the working channel 29 of the acceleration block SLIA with a longitudinal axis 23.

Figure 9:
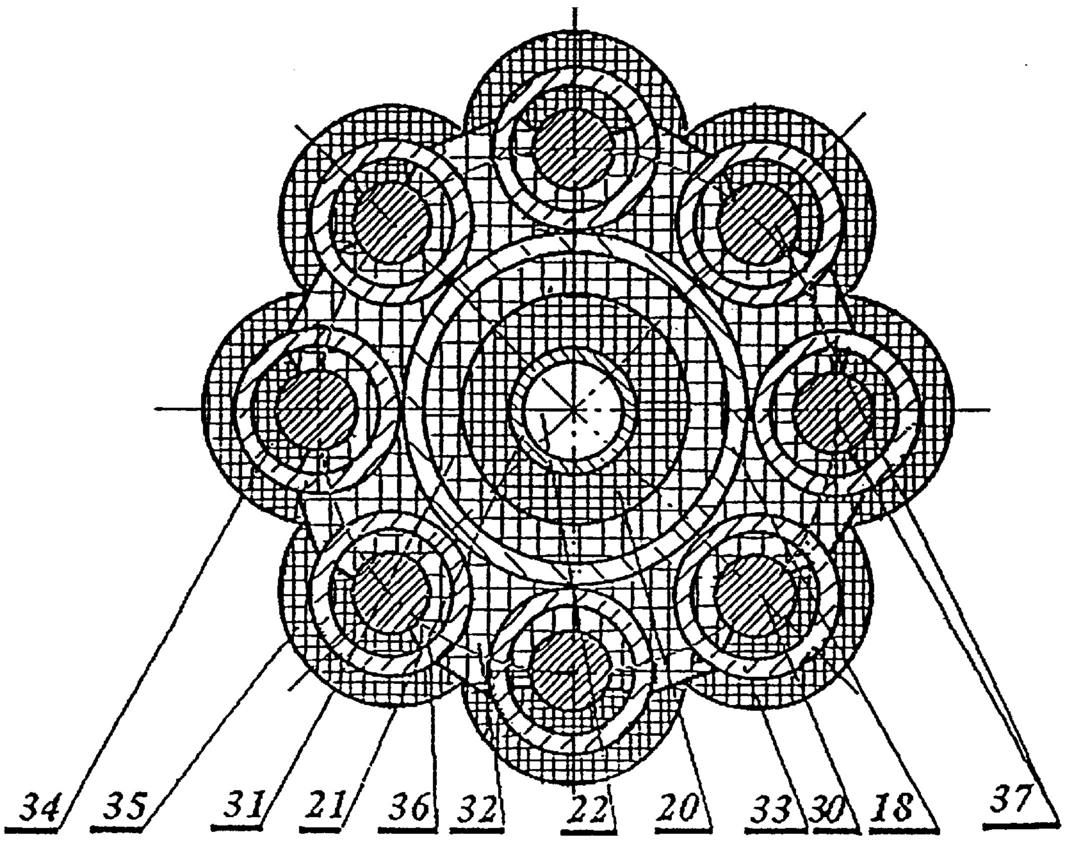
FIG. 9 showing a transverse cross-section of the variant of the multi-channel acceleration block, made of cylindrical acceleration blocks of SLIA with a tube-like cross-section.

The picture in the FIG. 9 shows the cross section of one of the structural variants of the acceleration block of MLIA, structure of which is shown in FIG. 2 and FIG. 3. The specificity of the structure of this MLIA is that that only the central channel (acceleration channel of the central SLIA) is used for the acceleration of a charged-particles beam when all other (peripheral) channels are used only for quenching (compensation) of the external electric fields and for the amplification the internal field in the central channel. Further on, all blocks of SLIA, which are directly used for acceleration of charged particles, are classified as the basic blocks when the rest of the blocks are considered as the auxiliary blocks.

The basic accelerating SLIA structure, presented in FIG. 9 (in this case it is the central SLIA), is composed of a magnetic core 18, having form of a cylindrical tube with a circular cross section and is made from a high-frequency magnetic material (e.g. ferrite or amorphous magnetic material). The auxiliary channels are oriented in such way that their working axis (axis of symmetry) 30 are parallel to the symmetry axis of the basic accelerating channel 22. Metallic wire is reeled along the direction of the wall of the tube. The external and the internal reels are designated by 32 and by 31, respectively. Focusing solenoid 20 is inserted into the internal part of the reel 31. A tube (a tube of the accelerating channel) 21, which is made from one of the nonmagnetic dielectric materials (e.g. from a vacuum ceramics which has high electric strength), is inserted within the solenoid 20. The central part of the tube 22 is used as the basic acceleration channel 22 for a charged-particles beam.

The basic (central) acceleration single-channel block is surrounded by eight auxiliary (peripheral) acceleration blocks of SLIA. Each of the latter has structure resembling the basic block structure. It is here, where wire reels were winded on cores 33, parallel to their longitudinal axis, the internal and the external parts of the reel is presented in the FIG. by 34 and 35, respectively. Besides the internal reels 34, in this structure are foreseen also the internal reels 36, which are joint with the external reel of the central (basic) SLIA. The central parts of the auxiliary (peripheral) channels are filled with rods 37, which are made of a nonmagnetic dielectric material of high electric strength, for the prevention of electric breakdown.

Figure 10:
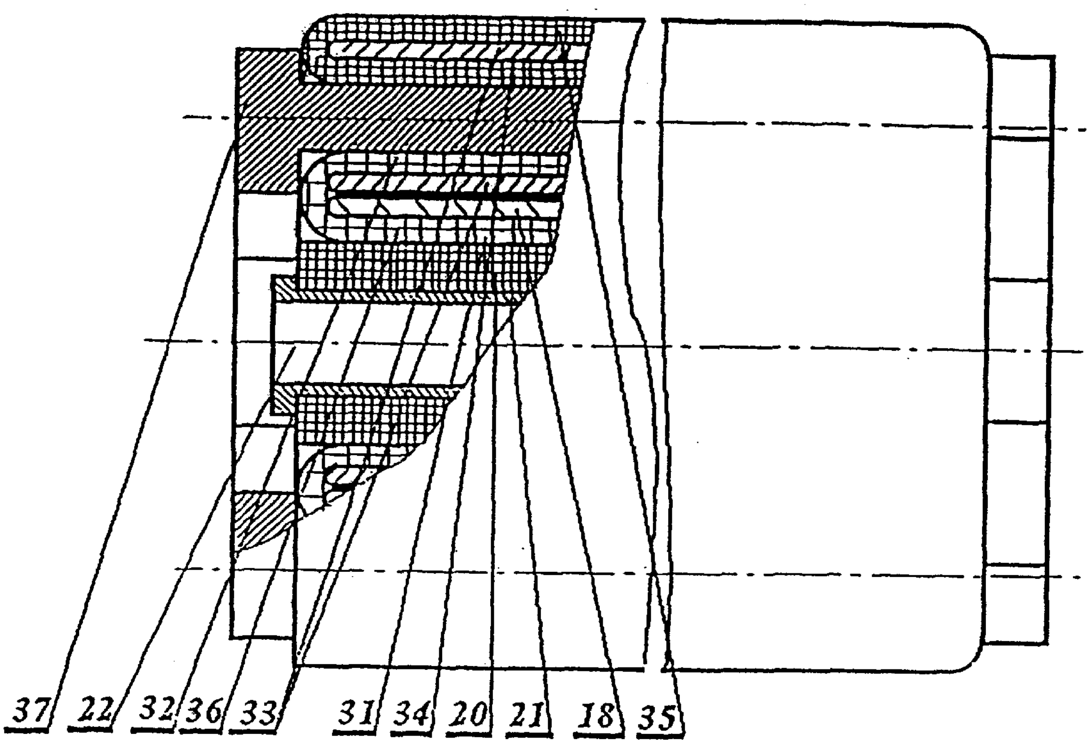
FIG. 10 shows the front projection of the latter structure.

FIG. 10 presents the frontal projection of the above-described structure.

The presence of joint wire reels for the basic and auxiliary single-channel acceleration blocks of SLIA (look the position 36) is one of the technological peculiarities of the proposed structural variant. Besides this, the distribution of the focusing solenoid 20 and the filling up the auxiliary single-channel blocks by nonmagnetic insulating material (look position 37) is foreseen. Also, the structures are proposed where the basic and the auxiliary single-channel acceleration blocks do not have joint wire reels, the focusing solenoid is not inserted and where, instead of the insulator 37 the airtight sealed dielectric tubes (e.g. prepared from high electric strength vacuum ceramics) are inserted. Also the structures are proposed in which the basic as well the peripheral acceleration blocks of SLIA are used for acceleration of charged particle beams.

The wire reels have a standard structure. It is proposed to prepare them by using wires having different form of cross section and wires having tube-like cross section. In the latter case it is proposed to use this type of wire for passing through it a cooling liquid. Besides this, all wire reels are attached to the source (or to a few different sources) of high-frequency alternating voltage, which is a component of the drive source presented as 6 on FIG. 1.

Figure 11:
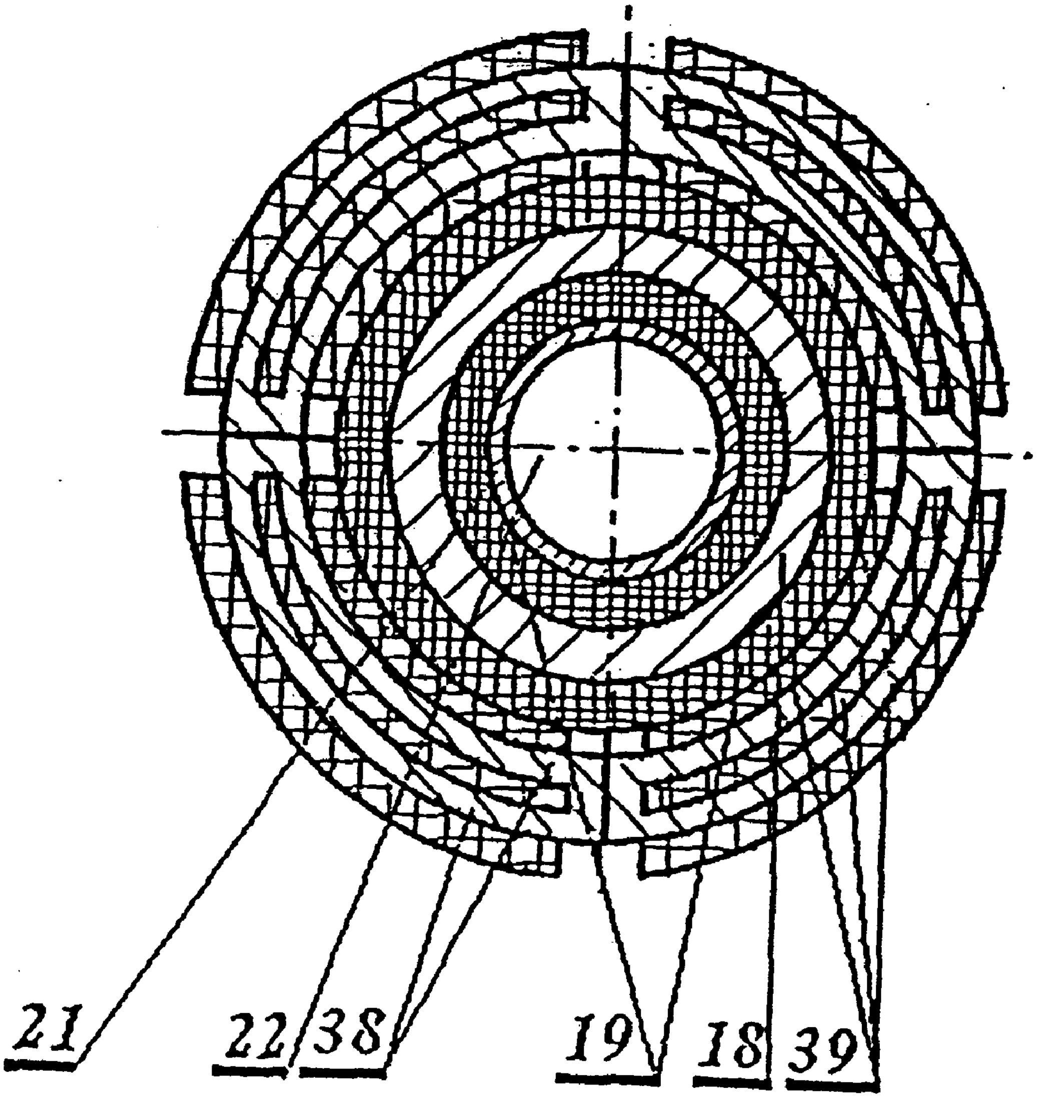
FIG. 11 shows the cross-section of a structure variant of a multi-channel acceleration block, having one (main) cylindrical and four furrow-like acceleration blocks of SLIA with tube-like transverse cross-section.

An analogous structural idea, however having somehow different form, is presented in FIG. 11. Here, like in the structure presented in FIG. 9 and FIG. 10, the basic acceleration single-channel block is made as a magnetic core 38, prepared in a form of a cylindrical tube of round cross-section, having wire reels 19 wound along its walls. The tube 21 encompasses the acceleration channel 22, which is prepared from nonmagnetic dielectric material of high electric strength. In a contrast to the previous structure, where the auxiliary (peripheral) acceleration blocks of SLIA have cylindrical form, here they have a groove-like form. Each of this groove-like accelerating single-channel blocks (in the given example has 4 blocks) holds groove-like magnetic cores 38. Within the groove-like core 38, channels are carved resulting in the formation, within the volume of the core, of external and internal walls. The wire reels 39 are wound in such way that a part of them encompasses the internal and a part of them encompasses the external wall. Consequently, each peripheral groove-like acceleration block SLIA has a pair of wire reels 39, the internal and the external reel, respectively. In addition to this, the internal carvings of the magnetic cores and the internal channels might be practically totally filled with wire reels or a part of each channel might be left unfilled. In the latter case, insulating dielectric material, which has a high electric strength, fills the space, free from wire reels.

Figure 12:
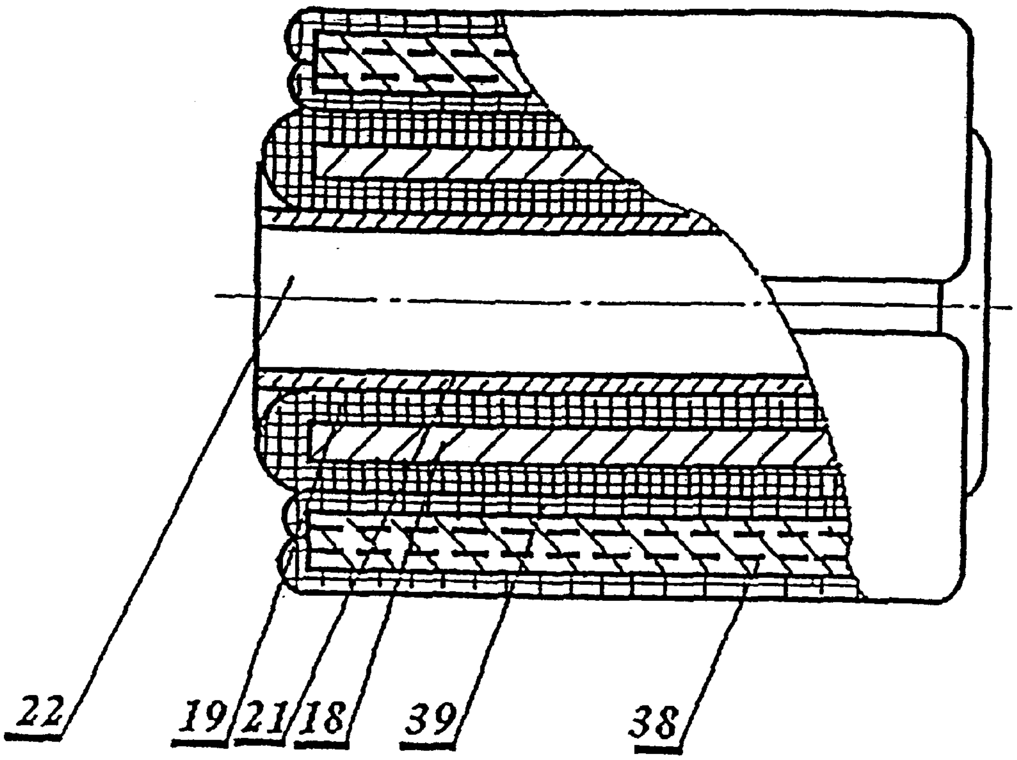
FIG. 12 shows the front projection of the latter structure.

In FIG. 12, the frontal projection of this structure is presented.

One of the peculiarities of the proposed structural variant (see FIG. 11 and FIG. 12) is the absence of the joint wire reels in the basic and the auxiliary single-channel acceleration blocks. Beside this, the accommodation of the focusing solenoid is not foreseen (as it is in the previous case, see position 20 in FIG. 9 and FIG. 10). Structures are proposed for MLIA, having groove-like peripheral (auxiliary) blocks, in which the basic and auxiliary SLIA have joint wire reels and have focusing solenoid placed between the internal part of the wire reels 39 and the tube 21.

Figure 13:
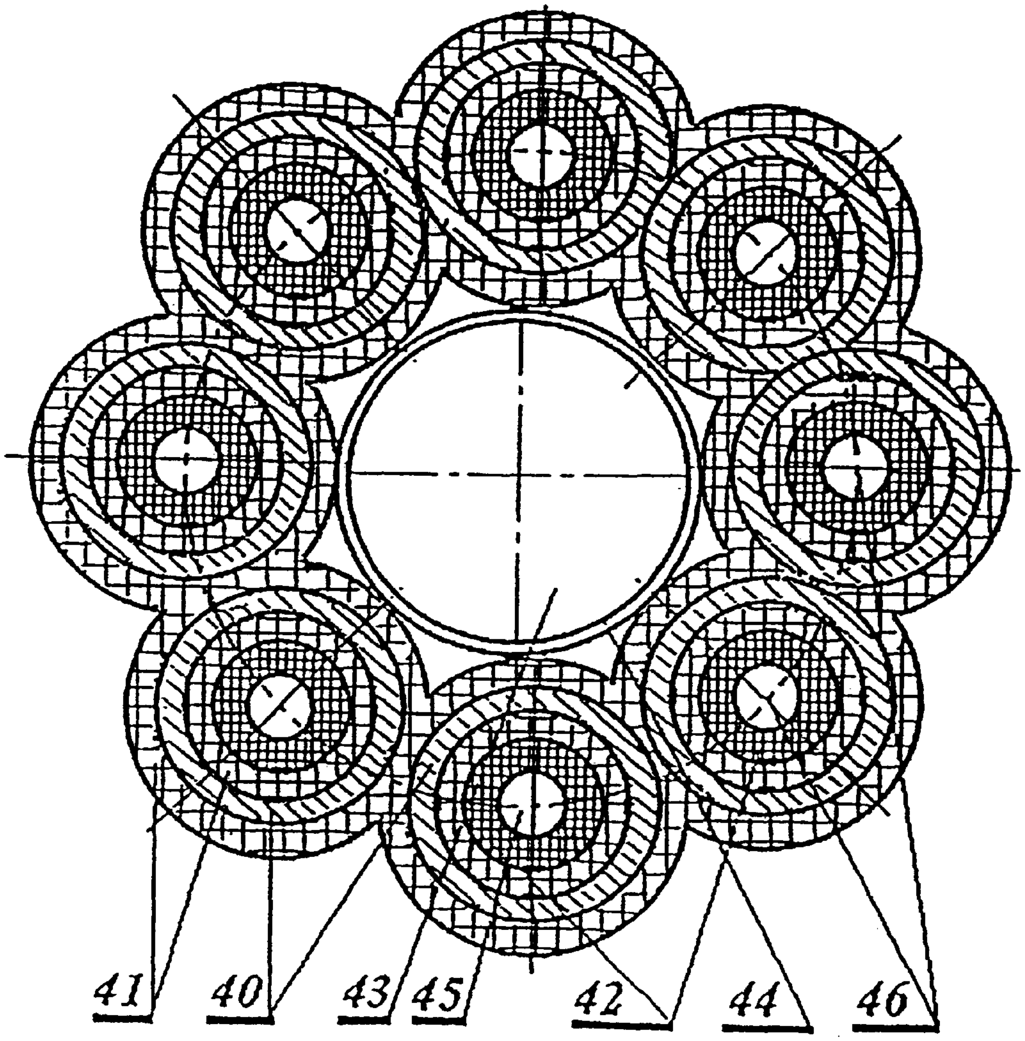
FIG. 13 presents the transverse cross-section of the structure variant of a multi-channel acceleration block, built from cylindrical parallel acceleration blocks of SLIA having a tube-like cross-section and arranged in a circle.

The basic peculiarity of the MLIA structure, the cross-section of which is presented in FIG. 13, is that that here all the SLIA blocks are basic. It means that they are attached to injectors of the charged-particle beams. Here, like in the structural versions presented in FIG. 9 to FIG. 12, each of the basic acceleration single-channel blocks has form of the magnetic core 40, prepared in the form of a cylindrical tube and having wire reels 41 wound along their walls. The position 42 represents the focusing solenoids, which are encompassed by the wire windings 41. All single-channel acceleration blocks are distributed symmetrically around the auxiliary chamber 43, which is screened from the effect of the electric fields by the shield 44. In the given structure, all working channels 45 are arranged in a circle in such way that their working axis 46 (in the given projection they are perpendicular to the surface of the drawing) are parallel and do not cross. In this structure, the chamber 43 is designed for the location of the drive source blocks and of the auxiliary systems, such as, for instant, control or cooling, etc. A structure variant is also proposed where, instead of the chamber 43, has a MLIA block, structure of which is presented in FIGS. 9, 10, 11, or 12.

The FIG. 13 shows the structure in which the wire reels 41 are attached to the high frequency drive source in such way that the electric field in each of the acceleration blocks of SLIA has an opposite direction than the electric field in the two blocks neighboring with it. The MLIA structure having such composition of the acceleration blocks is called the periodically reversal structure.

Figure 14:
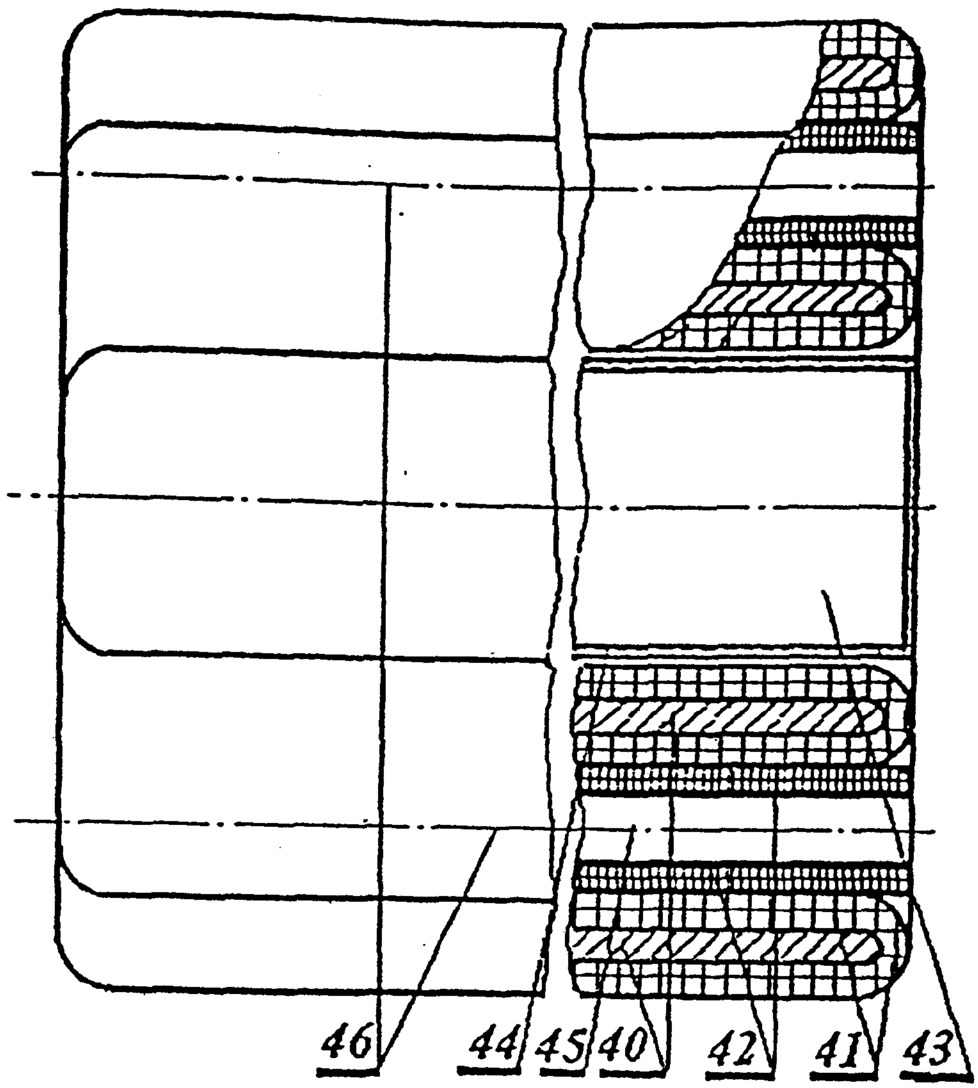
in FIG. 14 the front projection of the latter is given.

The FIG. 14 shows frontal projection of the above structure.

As it was mentioned before, in the cases illustrated by FIG. 12 and FIG. 14, all working channels of the acceleration blocks of SLIA are oriented in the way that their axis are parallel (look position 46). In agreement with the definition they do not cross each other. Another structural variants of MLIA is proposed in which the axis of the working channels of the acceleration blocks of SLIA are not parallel and do not cross at any place, or they cross in one point, or MLIA in which different groups of the working channel axis cross in different points. Besides this, structures are proposed in which only half of the acceleration blocks of SLIA are used as the basic (it means for the acceleration), while the rest of the blocks are used as auxiliary. In this case, the working channels of the auxiliary blocks are quenched by special dielectric (e.g. ceramic) inserts.

The azimuthal symmetry is the peculiar characteristics of the structure of acceleration blocks of SLIA, as it is illustrated on FIG. 9 to FIG. 14. Besides the azimuthally-symmetry structures the plenary structures are proposed also. In the latter structures, all the working of the acceleration blocks of SLIA is placed in one or in a few parallel (or not parallel) planes. These structures of the first type are considered as mono-layer (or one story). The second type structures are either multilayer or multistory. In a case when the acceleration blocks of SLIA are arranged in a way that their axis are in a few planes (parallel planes) and, in addition to it, the acceleration blocks of SLIA, in the neighboring planes are electrodynamically strongly bounded, these structures are considered as one-story multilayer structures. It is advised to build the multi-story structure from single-layer and multi-layer blocks in the way that the neighboring layer blocks (or the neighboring multilayer blocks) are electrodynamically not strongly bounded. The examples of the planar structures of the acceleration blocks of MLIA are given in FIG. 15 to FIG. 20.

Figure 15:
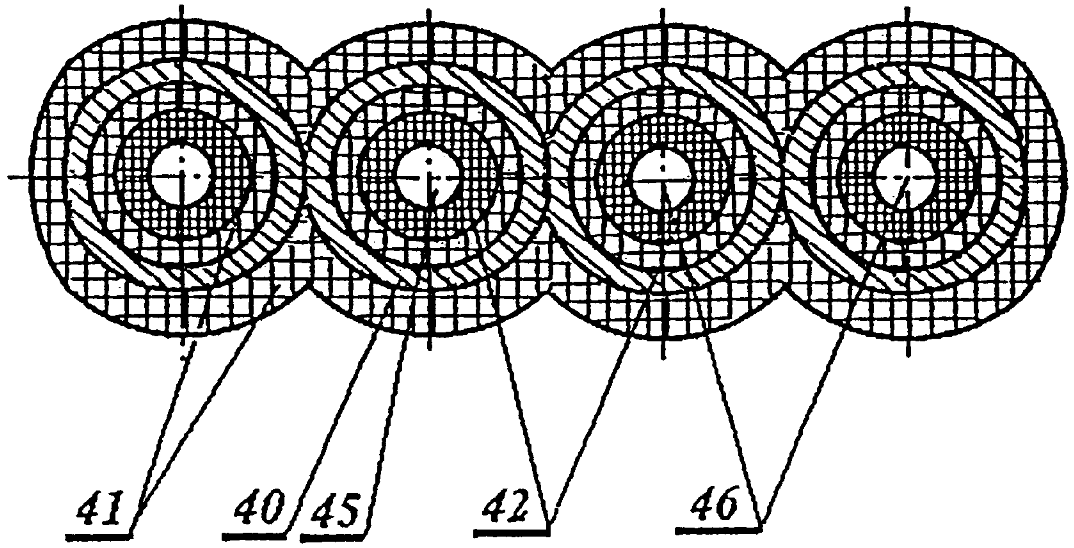
in FIG. 15 the transverse cross-section is given of the structure variant having planar one-layer construction of the multi-channel acceleration block, which is build of cylindrical parallel acceleration block of SLIA, placed in one plane and having tube-like cross-section.

The FIG. 15 illustrates the cross section of a mono-layer (it means also the one story) acceleration block of MLIA. Here, as in the structures presented in FIG. 13 and FIG. 14, all the acceleration blocks are basic; it means they are connected with the charged-particle beam injectors. The single-channel blocks are made in the form of magnetic cores 40, which have the form of cylindrical tubes with the metallic reel 41 wound along their walls. As in the previous case presented in FIG. 13, in FIG. 14, the focusing solenoids are designated as 42. In contrast to the previous case, here the working channels of the single-channel blocks 45 and their working axis 46 are placed in the same plane.

Figure 16:
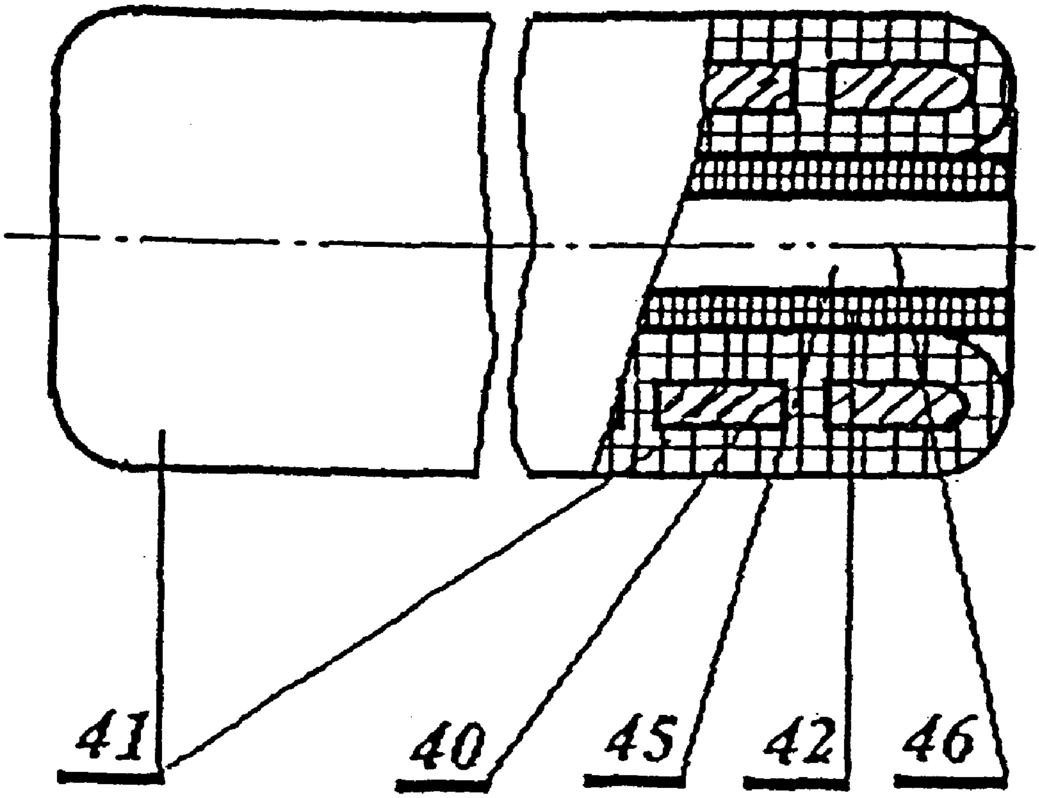
FIG. 16 shows the front projection of the latter structure.

The FIG. 16 shows the frontal projection of the above structure.

Figure 17:
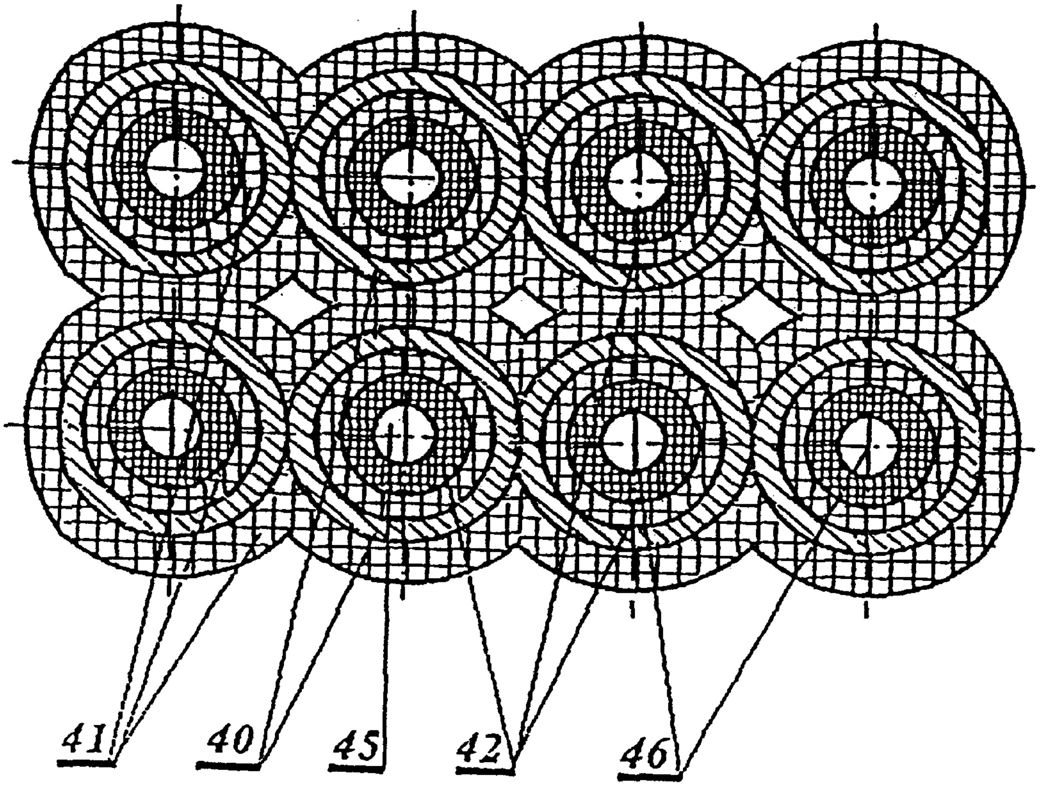
in FIG. 17 a transverse cross-section is given of the planar, two-layer structure variant of a multi-channel acceleration block, built of parallel cylindrical acceleration blocks of SLIA, distributed in two parallel planes.

The structural idea of the multilayer planar structures of the acceleration blocks of MLIA is illustrated in FIG. 17. The example of a two-layer planar structure is given in which the magnetic cores are marked as 40. The latter are made in the form of cylindrical tubes having wire reels 41 wound along their walls. As in the previous structural version, focusing solenoids are deigned by 42. The difference is in the distribution of the working channels 45 of the single-channel blocks (and their respective working axis 46) in two parallel planes.

A series of variants is proposed for the monolayer and multilayer planar structures. This includes that the axis of the working channels can be parallel and not parallel and such that cross or not cross, etc. Besides this, the focusing solenoids are not used in some of the structures and only half of the acceleration channels are used as the basic. All other channels in these structures are used as the auxiliary and special dielectric inserts quench them.

Figure 18:
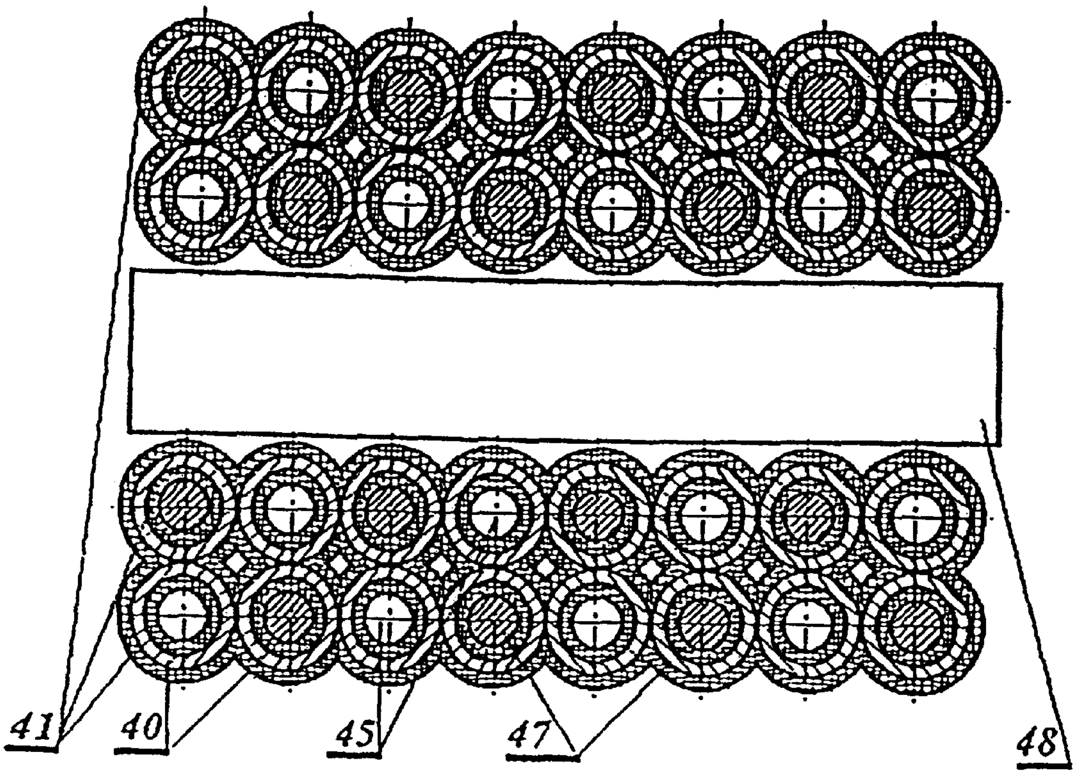
FIG. 18 presents a two-layer two-story structure variant of multi-channel acceleration block, which is built from the parallel acceleration blocks of SLIA having tube-like transverse cross-section and located in four parallel planes.

The FIG. 18 presents an example of a two-layer two-story system. Here, as in the FIG. 15 to FIG. 17, magnetic cores 40 are prepared in the form of cylindrical tubes, having metallic reels 41 along their walls, and having the working channels of the monochannel block designated as 45. In a contrast to the previous structural versions, here it is shown that a half of the working channels 47 is auxiliary and there are quenched by dielectric inserts. An electric screen 48 is placed in the space between the two two-layer blocks. It is used for the distribution of additional auxiliary equipment (the drive force, management and control systems, etc.). The main peculiarity of this structural variant is that, owing to the spatial distribution of the two two-layer planar blocks (and the presence of the electric screen 48) the electromagnetic interaction between them is diminished.

Multi-sectional structures of MLIA are also proposed. Each of these structures is composed of linear consecutive order of a few separate sections of MLIA, and is united with each other by standard transition devices.

Standard structure for the formation of electron beams and the beams of positive and negative ions are proposed for the injectors of the charged-particle beams.

The source of the high-frequency alternating current is accomplished by the known method. This can involve generators (with internal or external actuation) of the sinusoid signals as well the systems for the formation (including computer synthesis method) of pulses of a given complex form. It is proposed to use the radio frequency drive force (as the most perspective variant) in the form of a distributed system where each reel (or a group of reels) is attached to a separate semiconductor amplifier of the voltage pulses. In addition to this, all the amplifiers (via in-between amplifiers and the set-back lines, when needed) and the drive force of the charged-particle beam injectors are synchronized by one and the same generator of pulses.

The output-device block (the output block) is composed of the output devises. Each of the output devices is made in a form of the well-known forms in the technology of the accelerators with charged-particle linear beams. This encompasses the system such as focusing, de-focusing, scanning, deflection, and modulation etc. of the charged-particle linear beams.

Figure 19:
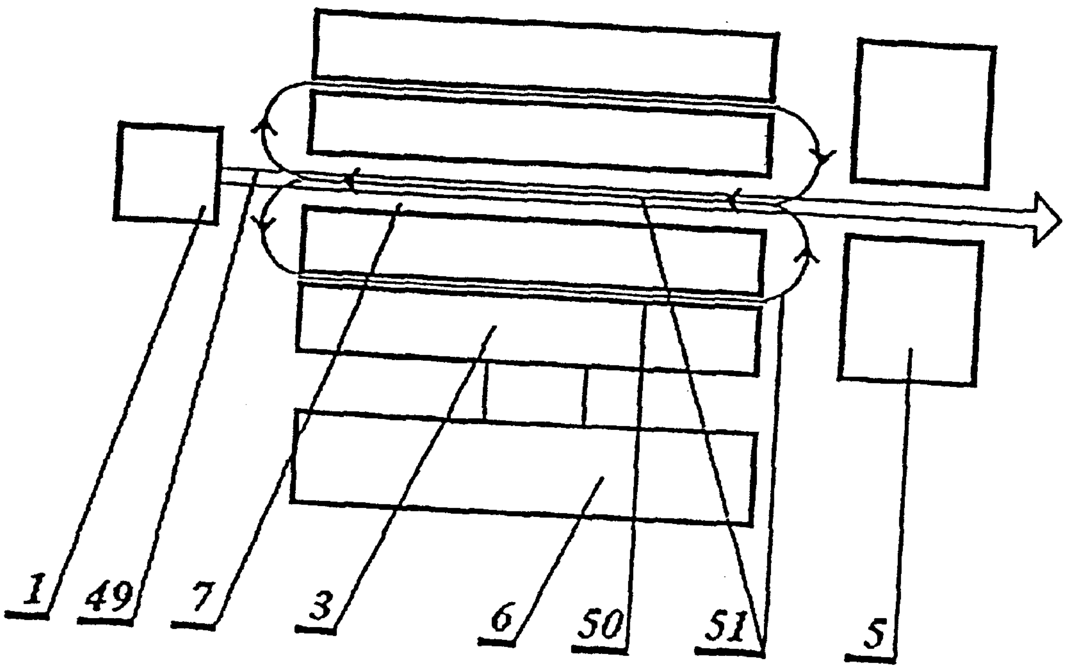
in FIG. 19, the principle of the performance of the proposed device is illustrated by using the structure variants presented in FIG. 9 and FIG. 10 as an example.

The performance of the proposed invention is explained by FIG. 19 to FIG. 36. In FIG. 19, by using the structure variant of the acceleration block of MLIA, which is presented in FIG. 2, FIG. 3, FIG. 9, and FIG. 10, the principle of the operation of the proposed devise is illustrated. Here, the injector of charged-particle beams (in this example of the electron beams) ejects the beam 49, which subsequently is guided into the basic working channel 7 of the multichannel acceleration block 3. The latter is attached to the drive source 6, which induces alternating electric current in the metallic reels with a given pulse form. The flow of the current in reels causes the generation of a time-in-time magnetic field in the magnetic core of the multichannel acceleration block 3. As a consequence of the electric induction effect, vortex electric field is generated in the basic working channel 7 as well in auxiliary (peripheral) channels 50, 51 show the lines of force of this electric field. The given electric field accelerates the electrons of the beam 49 in the basic working channel. 7 The accelerated electron beam is subsequently guided into the output device 5.

As it was mentioned before, a structure variant of MLIA is proposed in which not only the central but also the rest (peripheral) acceleration channels are use as the basic channels. This can have two more partial structural variants.

Figure 20:
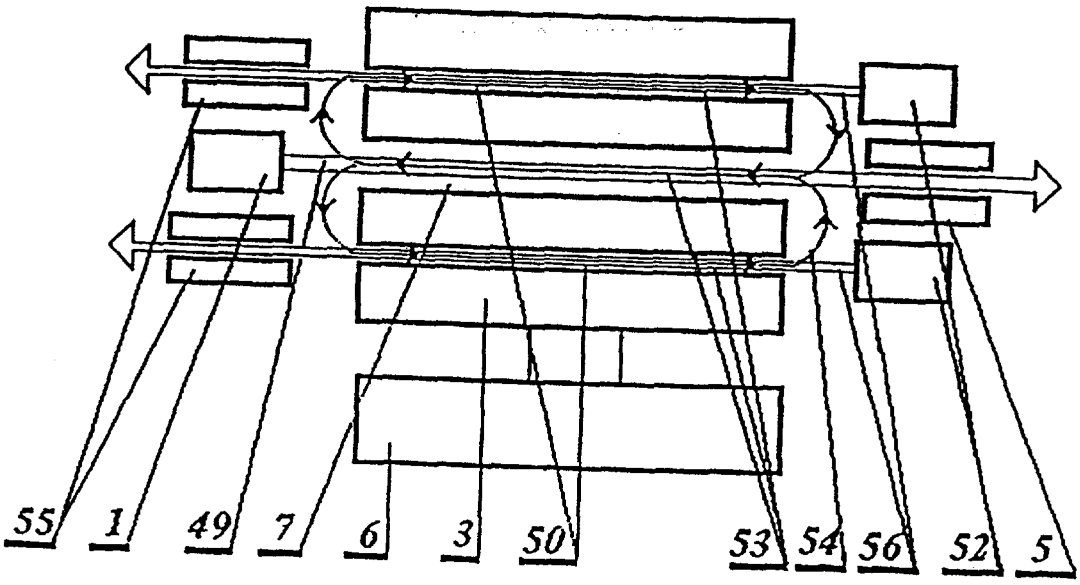
FIG. 20 shows the performance of the structure variant in which not only the central but also the peripheral one-channel acceleration blocks are used in the acceleration of charged particles of the same charge sign, e.g. electrons.

In the first variant, the same charge sign particles (e.g. electrons) are accelerated in all acceleration channels. The principle of the performance of such structure is illustrated in FIG. 20. The peculiarity of this structure is that here the injectors (position 1 and 52) of electron beams (position 49, 56) are attached to the acceleration channels (to the central channel 7 and the peripheral channels 50) by the opposite sides. This is explained by that the pulse potential source (which are components of the drive source 6) are attached to the multichannel acceleration block 3 in a way that in working channels (the central channel 7 and the peripheral channels 50) vortex electric field is generated having the opposite orientation of vector of the voltage. The direction of the electric field in the channels are described by the linear segments of line 53, which are closed by the external curved segments 54. Respectively, in this structure, the output devices for the peripheral (55) and central (5) electron beams (49, 56) are in the opposite ends of the acceleration channels 50 and 7. The electron beams 49 and 56 are moving in the acceleration channels 7 and 50, respectively, in the mutually opposite direction.

The peculiarity of the second structural version of the MLIA is that particles of different charge, e.g. electrons and positive ions, are moving in the central and the peripheral acceleration channels. The principle of operation of this structure is explained by FIG. 21. Here, the electron and ion injector 52 (forming electron and ion beams 57, respectively) are placed at the same side, onsite the acceleration channels 7 and 50. Because the structure of the multichannel acceleration block 3 and the method of its attachment to the drive source 6 block are the same as that in FIG. 20, then, respectively, the directions of the vortex electric field 53 in the central and the peripheral channels (which are mutually opposite), at the given distribution of injectors 1, 52, are accelerating for electron 49 as well for the ionic 57 beams. In contrast to the previous structure, all outlet devices 5 and 58 in the present structure are placed on one and the same side, opposite the injectors 1 and 52 at the end of the acceleration channels 7 and 50, respectively.

Figure 21:
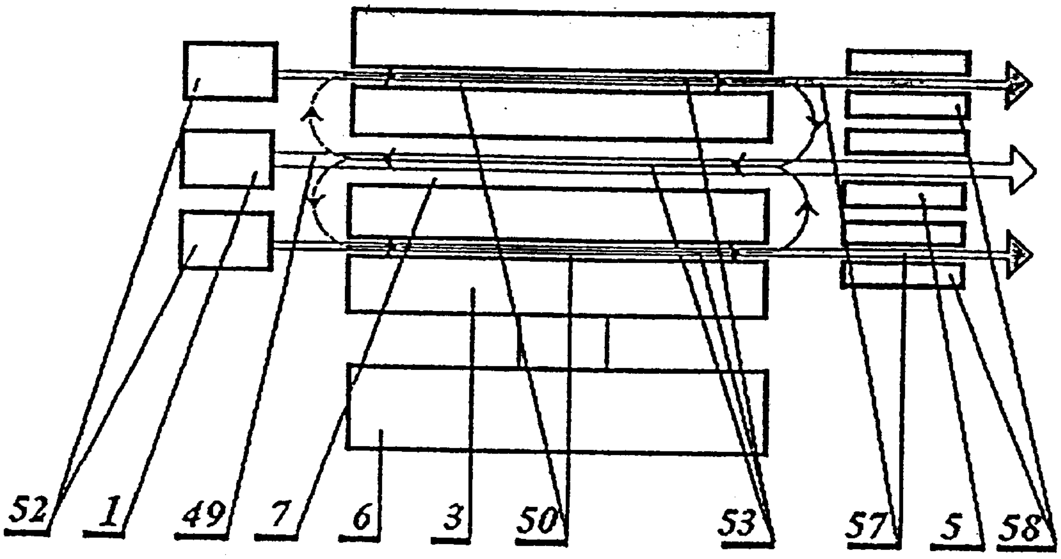
in FIG. 21, the performance of the structural variant is illustrated in which the central as well as the peripheral acceleration blocks are used in the acceleration of charged particles of different charge sign.

Consequently, the structure variant illustrated by FIG. 21 is meant for a simultaneous acceleration of electron as well ion beams. This includes the situations when it is necessary to accelerate, in one and the same system, electron beam and the beams of ions with different masses and initial energies. This might be beneficial in cases when a precise pulse-time synchronization is needed of different type charged particle beams.

A "reverse" structure variant is proposed in which the central working channel is designated for acceleration of ions and the peripheral channel for acceleration of electrons. This variant is designated for situations when, at the output, the energy of the ionic beams has to be much higher than that if the electron beam. The exception is when all the beams are high-energy beams. Such possibility is feasible in this structure because the acceleration field in peripheral channels is always weaker than the field in the central channel. This is the peculiarity of this structural variant.

A structural variant is proposed in which the central working channel is used as an auxiliary, it means its role is in compensation of the external electric field and in generation of acceleration field in peripheral channels. In this case, the peripheral working channel is performing the role of the basic channels. This structure can be use for acceleration of ions as well as electrons. This variant has a very limited application since, as it was mentioned before, the acceleration field in the peripheral channels in the discussed structures, is always significantly weaker than the field in the central channel.

The structures of the multichannel acceleration blocks presented in FIG. 13 and FIG. 14 are more efficient in such cases. The principle of the performance of this type acceleration blocks is illustrated in FIG. 22 and FIG. 23.

Figure 22:
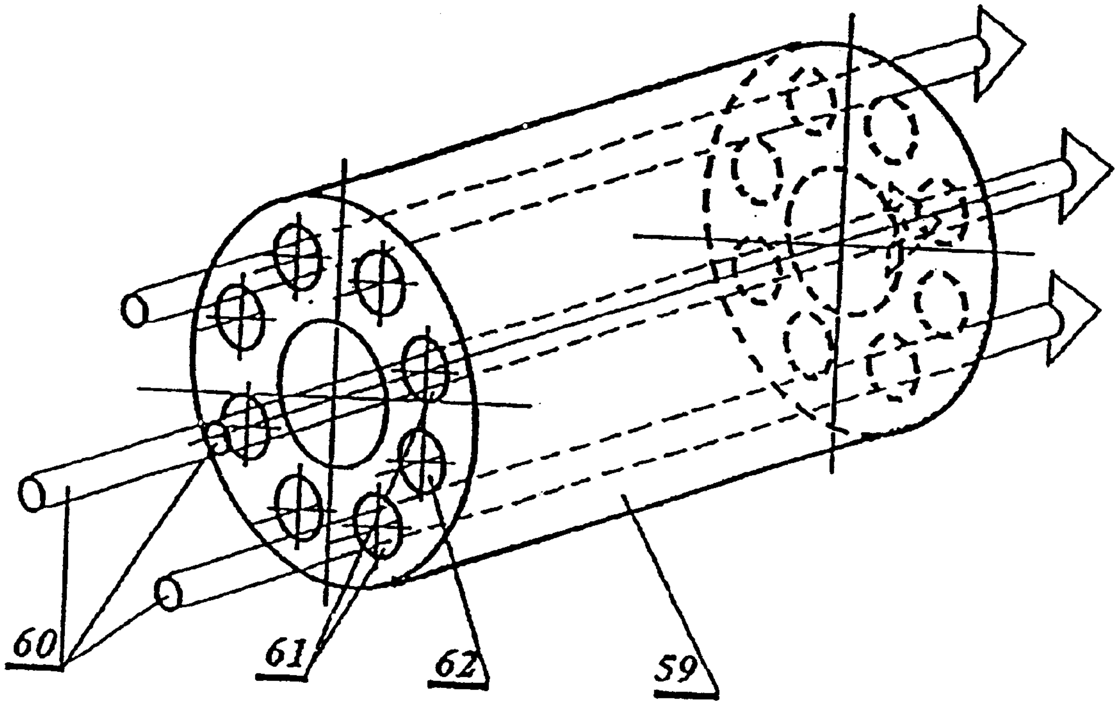
FIG. 22 explains the principle of the system designed for acceleration of the same-sign charged particles in acceleration block structures presented in FIG. 13 and FIG. 14.
Figure 23:
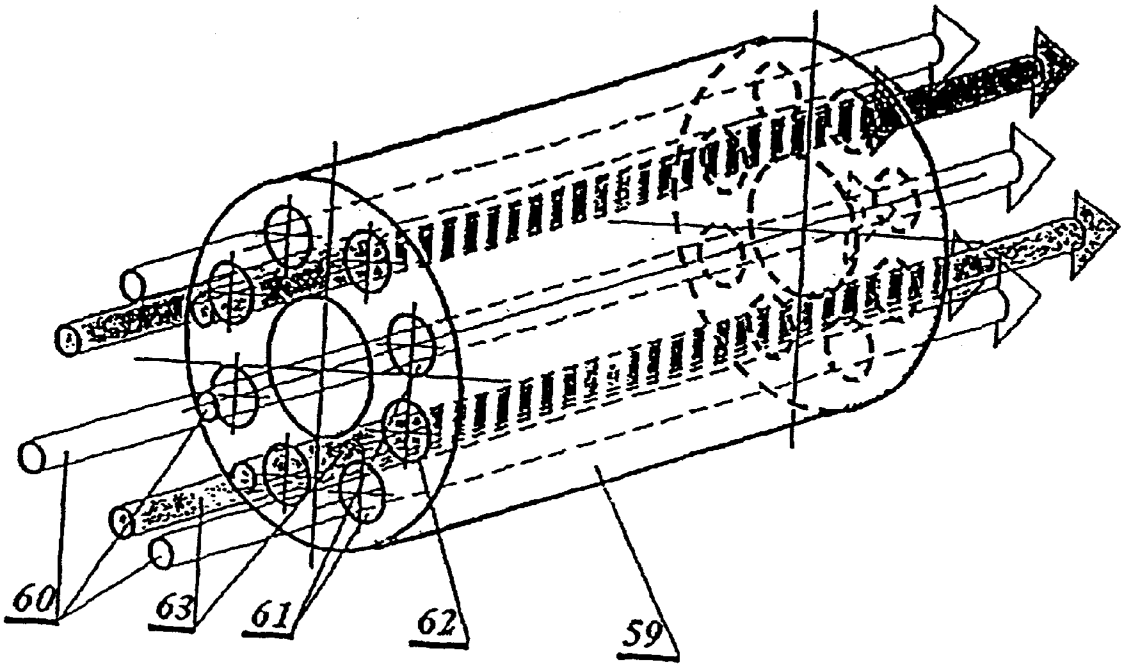
FIG. 23 illustrated the performance of the system having acceleration blocks illustrated in FIG. 13 and FIG. 14 in the conditions when in the acceleration channels of the acceleration block a simultaneous acceleration of the opposite-sign charged particle beams is provided.

The FIG. 22 explains the principle of a system designed for acceleration of one-sign charged particles. Here, beams of charged particles 60 (e.g. electrons) are introduced to cylindrical multichannel acceleration block 59 (see the example of its construction in FIG. 13 and FIG. 14). In this case, two kinds of working channels are differentiated, the basic 61 (those which are used for acceleration of charged particles) and auxiliary 62 (those which are used only for creation of the compensating electric field). The charged particle beams are generated by injectors, which are not shown for simplification reasons. The peculiarity of this structure, differing from the above-discussed structures (FIG. 17 to FIG. 21), is that here the accelerating electric field in each of the working channels is in the opposite direction of the direction of the two neighboring channels. It means that only a half of the working channels (in this case four) is accelerating for the same sign beams moving in the same direction. Accordingly, all injectors of the same-sign charged-particle beams are placed at the side of the acceleration channels 59, opposite the basic working channels 61.

A structure variant is proposed in which all working channels are basic. In the channels designated for acceleration of the same sign particles, the injection block is composed of two smaller parts, which should be placed in opposite side of the acceleration block. In addition to this, the charged particle beams which are accelerating in each of the working channels 62 (which in the previous example were used as auxiliary, see FIG. 22, and here are functionally transformed into basic channels) move in direction opposite to the direction of beam movement in the neighboring beams.

A structure variant is proposed in which acceleration block is placed within the volume of the central part as it is shown in FIG. 9 to FIG. 12. In this structure, only the central working channel is used as the basic channel. For an example it is used for acceleration of an ion beam. It is foreseen that such structure can be especially effective in cases when electron an ion beams are of high current and have high density.

The FIG. 23 illustrates another structural variant. Its peculiarity is that beams of opposite sign particles, e.g. electrons 60 and ions 63, are accelerated simultaneously in the acceleration channels of block 59. The beams are generated by electron or ion injectors, allocated at the same side of the block 59, which are not illustrated for simplicity purpose. Such special configuration allows the directions of the acceleration field in "electron working channels" 61 and the field in "the ion working channels" 62 to be opposite each other. In this structure, owing to the multichannel structure the problem of the transport of the dense high-current electron beams is much easier than in the traditional SLIA. For example, in the presence of ten "electron channels" and at the pulsed current strength of each partial electron beam, approximately 10 kA (Redinato L. "The advanced test accelerator (ATA), a 50 MeV, 10 kA Inductional Linac." *IEEE Trans.*, NS-30, No. 4, pp 2970–2973, 1983), a relativistic beam of approx. 100 kA current strength and hundreds MeV relativistic beam can be emitted at accelerator outlet (after a merging procedure). In such a way, in the presence of strong-current injectors of ions, at the same current strength of partial beams, a beam of intense relativistic quasi-neutral plasma can form at the outlet of the system. Based on this concept one can build devices with record characteristics by using combination of such parameters like current strength, energy, the transport length of the multi-beam quasi-plasma system without a loss of the initial form (or the security of the formation of a given configuration).

Figure 24:
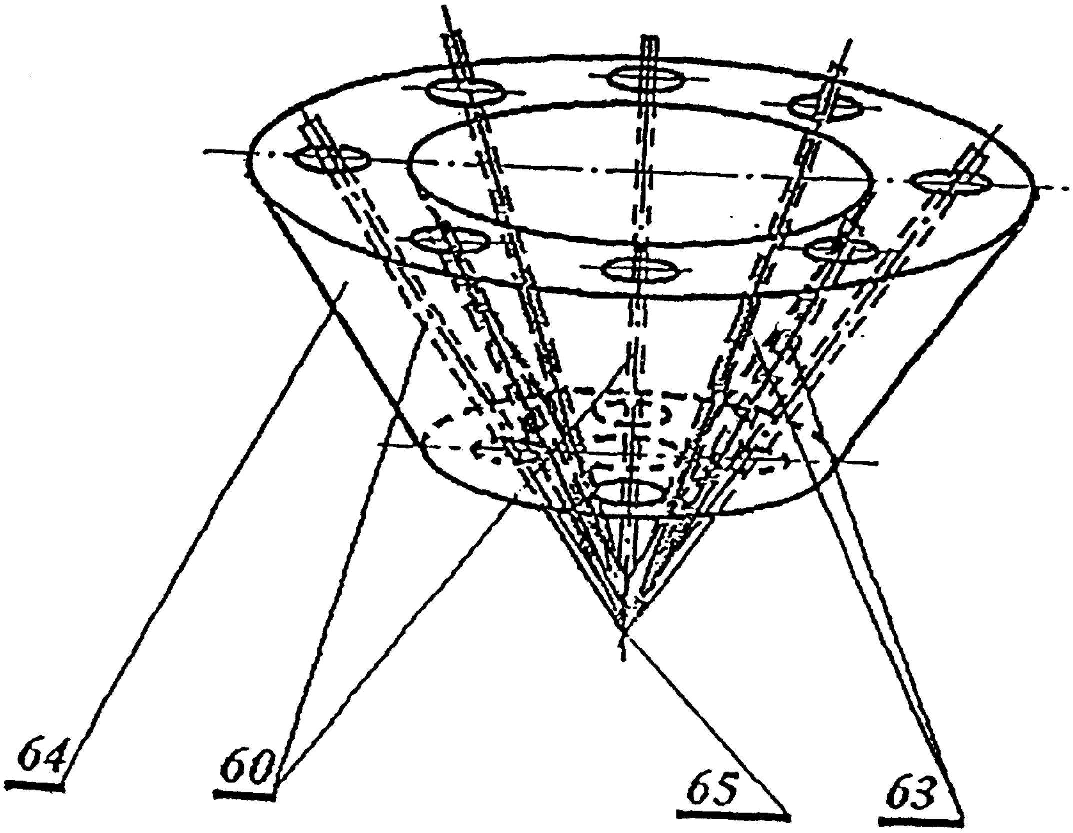
FIG. 24 illustrates performance of a system in which the structure of the acceleration block makes possible a focusing of beams having different charge sign in a small region (focus)

In such structures, the procedure of the collection of all beams into one plasma beam might be made easier when the axis of all acceleration channels are not strictly parallel. For example, when they join in a point of focus. An example of such structural type is illustrated in FIG. 24, where a multichannel acceleration block has form of truncated conus. The electron beams 60 as well as ion beams 63 in this case are moving in working channels along the working axis and cross in one point (focus) 65. The position of the focusing point might be regulated in depth and shifted in the transversal plane by rearranging the output devises, which allow emersion of beams from acceleration channels.

Similar structures are proposed in which different groups of beams cross at different focusing points. Structures in which all beams are not parallel and do not cross are proposed also.

The principal peculiarity of the proposed accelerators, differing from the known accelerators, is the application of the method of compensation (quenching) of external electrodynamic organization of the magnetic inductor system. As a result of this, the external electric field, which at any point near MLIA surface forms as a collective field for all monochannel acceleration blocks, is much weaker than the external field of any of the individual monochannel acceleration blocks in this point.

The method of comparison is used for an explanation of the principle of the external electric field quenching, which is applied in this invention. At first we analyze the physical mechanism of the generation of the external electric field in a known monochannel accelerator (Redinato L. "The advanced test accelerator (ATA), a 50-MeV, 10-kA Inductional Linac," *IEEE Trans.* NS-30, No 4, pp 2970–2973, (1983), and then we explain the physical laws of the external electric-field quenching method, which is used in this invention.

Figure 25:
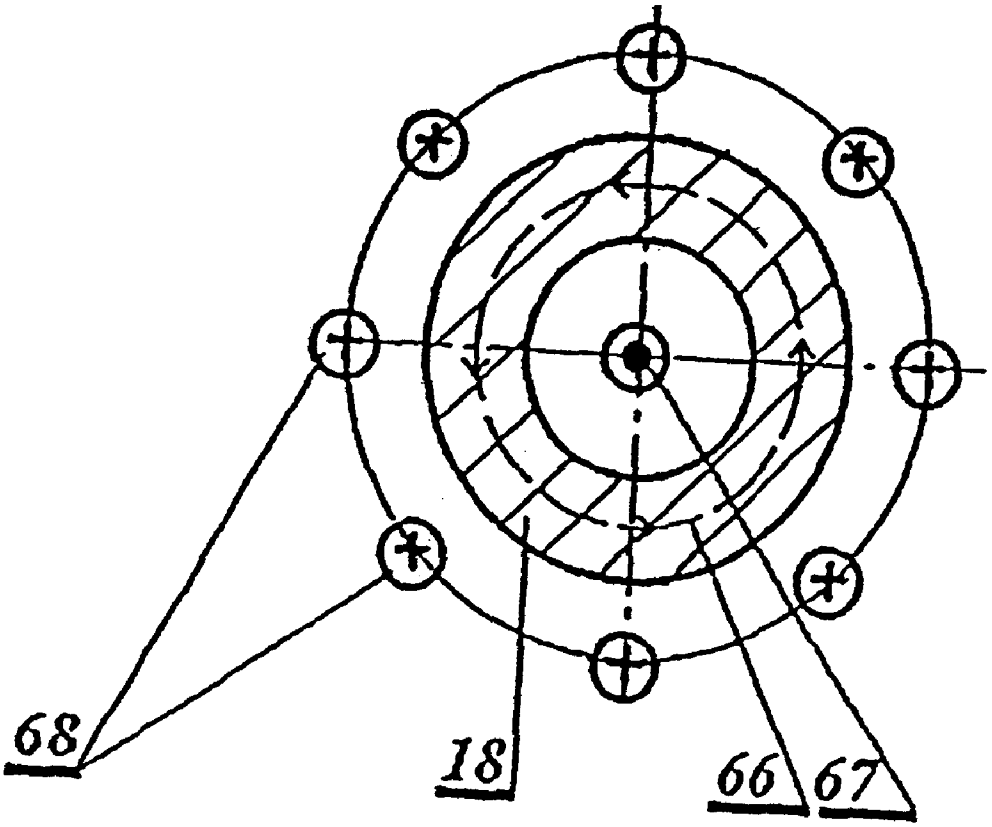
FIG. 25 shows formation of varying-in-time magnetic current in magnetic cores (in their transverse cross-section) and of vortex electric field inside and outside of a separated one-channel acceleration block without screening.
Figure 26:
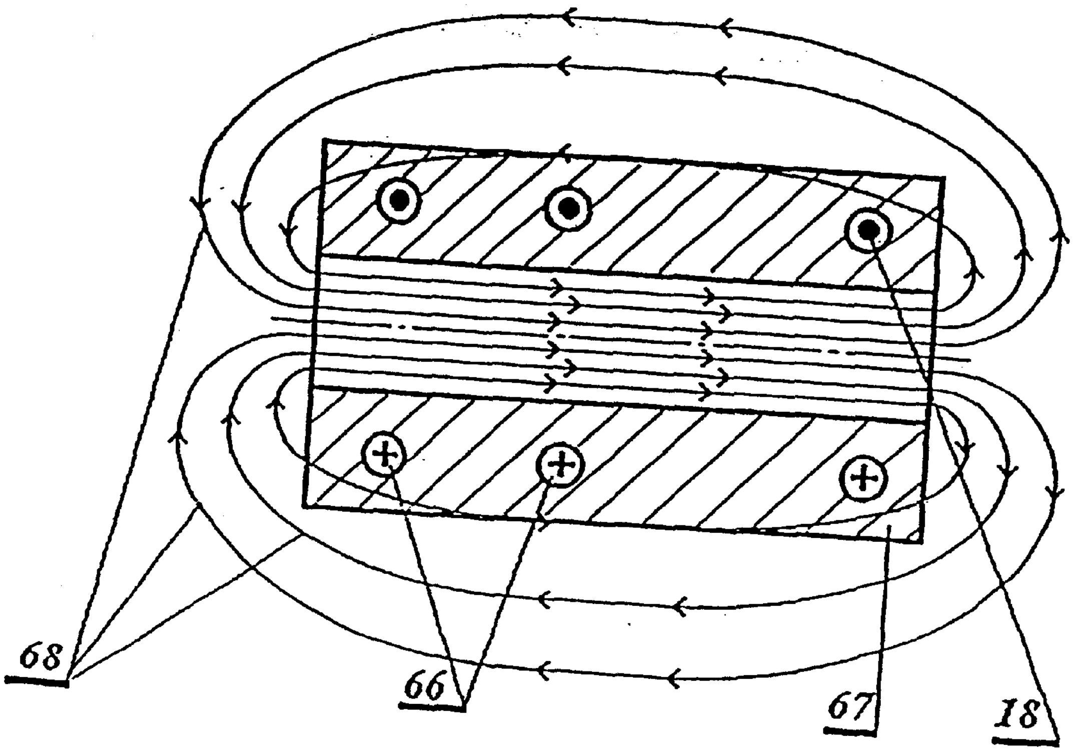
FIG. 26 shows the front projection of the latter scheme.
Figure 27:
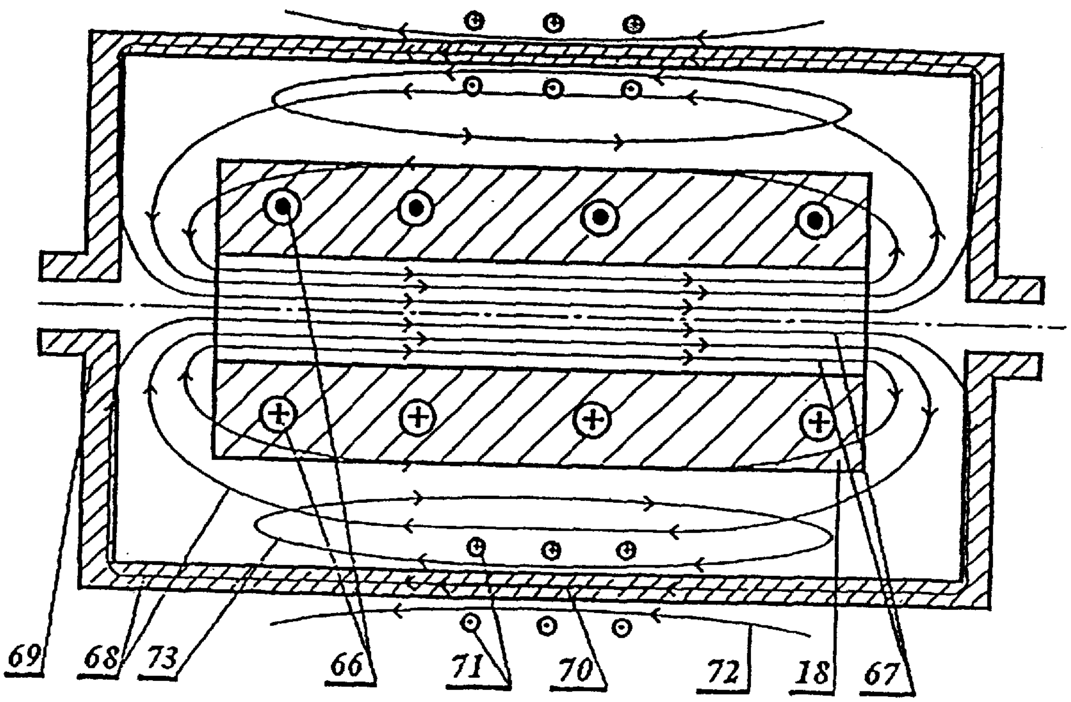
FIG. 27 shows the same scheme of the formation for a separated one-channel acceleration block with a metallic screen.

The essence of the mechanism of the external electric-field generation in monochannel accelerators is explained by FIG. 25 to FIG. 27. In the FIG. 25 and FIG. 26 show schemes of the formation of the alternating-in-time magnetic flow in magnetic core of a monochannel acceleration block without screening (look at position 18 on FIG. 4 to FIG. 6) and of a vortex electric field within and outside it. Herewith, the illustration in the FIG. 25 corresponds to the transverse cross-section of the core 18 when the FIG. 26 describes the same physical picture in the frontal projection. The alternating current, which flows in wire reels of the monochannel block, actuates alternating-in-time magnetic flow 66 in this block. Subsequently, owing to the electromagnetic induction effect, vortex electric field, 67 and 68, forms in the surrounding space. The position 3 shows the direction vector of the internal field potential (it means of potential of the acceleration potential) whereas the position 4 shows the direction vector of the external field potential.

It should be mentioned that, at a large distance, partial quenching effect in present also in SLIA. In any point in the space surrounding the working channel zone, the electric field forms as a superposition of two mutually-oppositely oriented electric fields. On of these fields is generated by a part of magnetic flow 66 which is near the core. The second field forms by the magnetic flow, which is flowing on diametrically opposite side of the core. Since both of the parts of the magnetic flows are oriented in the mutually opposite space, the fields which these flows generate, in any point of the core-surrounding space are mutually opposite directed. It should be mentioned that the distances from the point of observation to each of these magnetic flows are different. They differ by the value of the diameter of the magnetic core. It means, that, in this case, a substantial mutual compensation can be possible only at the distances much larger than the diameter of the magnetic core of acceleration block of SLIA. For example, at an assumed core diameter of magnetic core, the total compensation owing to the above-described physical mechanism can be estimated to be approximately 2 m or more. We should mention that in the contemporary SLIA the diameter of cores (it includes strong-current structures of SLIA with focusing solenoid (see FIG. 4 and FIG. 5) can reach 5 meter. It means that the working dimensions of such systems (the dimensions of the space "occupied" by strong electric field) might be even larger than this. This problem can be partially solved by introduction of special metallic screens, however, a radical solution of this problem within the framework of the structural ideology of the basic prototype (Redinato L. "The advanced test accelerator (ATA), a 50-MeV, 10-kA Inductional Linac," *IEEE Trans.*, NS-30, No 4, pp 2970–2973, 1983) was not found.

In such a way, the given examples reveal that the presence of a strong external electric field directly near the surface of acceleration blocks a principal peculiarity of the prototype. As we mentioned before, in practice, for quenching of the external field technical method is used. It involves using of a screen. Physical essence of screening of electric field is illustrated by FIG. 27. The basic peculiarity of this structure is the presence of a metallic screen 69. For a part of force lines of the external electric field 68 the screen appears to be a lock, since they cannot go beyond the screen 69. Electric current 70 forms under an effect of the electric field within the screen. Subsequently, this current generates magnetic field, part of which 71 penetrates farther beyond the limits of the internal and external surfaces of the screen 69. Since the electric field 68 and 67 is alternating in time, the induced by it the magnetic field 71 is also alternating in time. Because of this, an additional electric field, external part of it is designated by 72 and of the internal by 73, forms near the surface of the screen. Herewith, the external part 72 of the electric field represents an n extension of the internal field 68 beyond the screen 69. Consequently, in this case, the effect of the screen 69 results in weakening of the electric field 68 the space beyond its limits. The weakening is larger, the stronger is the value of the induction current in its walls and the larger are Ohmic energy losses at this current flow. In addition to this, the reactive mechanism of the external field weakening, related with the skin effect, is also present. The correlation of the screen thickness with the skin layer has also a crucial role in screening. As it is known, the latter depends essentially on the working field frequency that is screened. Consequently, the efficiency of a screen effect is larger the larger is the thickness of screen's walls. This mechanism works well in a case of NVCH of fields and is inefficient in the radio frequency range. For example, for a total screening of vortex electric field at its frequency 30 h4Hz (which is typical for this class of systems) it is necessary to have an approximately 50 cm thick screen, what is practically not real. At smaller thickness, significant part of electric field 68 (in the form of the external part of field 72) penetrated beyond its limits more the thinner is the screen.

The, non-stationary charge distribution in the body of a screen is an effect which is related with the flow of currents within the walls of the screen. A part of the external field energy is generated also owing to this effect. In a series of structures this effect has a useful application. The system presented in FIG. 3 could be an example of such system. The peculiarity of this structure is the preparation of the central tube 15 of the acceleration channel 7 from a conducting material e.g. nonmagnetic metal). The presence of the disruptions 16 and 17 (acceleration intervals) in the tube 15 is important. In this case, the vortex electric field of inductors penetrates into the acceleration channel only in the volume limited between 16 and 17 disruptions.

In such a way the acceleration in this case is realized under the effect of this field in the acceleration intervals 16, 17 on charged particles which are accelerated.

The physical mechanism, which is used in the presented invention, is developed for quenching of the external vortex electric field (look FIG. 28 to FIG. 31).

Figure 28:
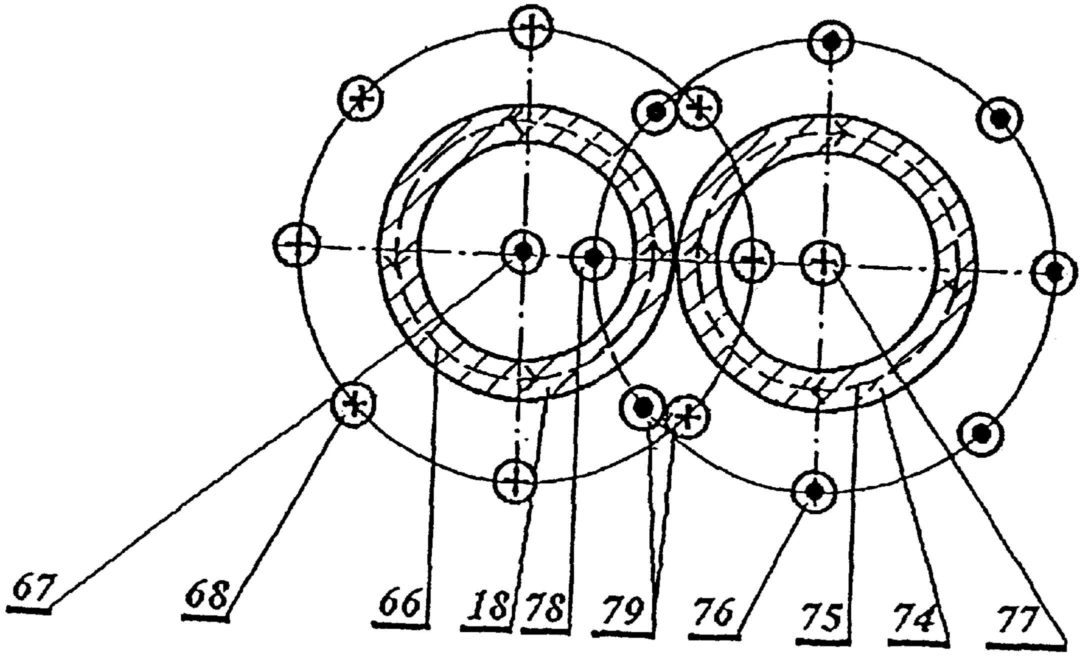
FIG. 28 illustrates the general idea of quenching of the external fields which are generated by different one-channel blocks by using two parallel one-channel acceleration block as example.

The general idea of this mechanism of quenching is illustrated by a simple example of two parallel monochannel acceleration blocks in FIG. 28. The changes in time of magnetic flows 66 and 75, which circulate in mutually opposite directions, are presented in magnetic cores 18 and 74 of two monochannel blocks, structure of which is given, for instance, in FIG. 6. As a consequence, each of the cores 18 and 74 generates its own external 68 and 76 and internal 67 and 77 electric fields. In this it is crucial that as it was mentioned of the circulation of the magnetic fields 66 and 75 is mutually opposite. Consequently, the direction vectors of the tension of the external electric fields 68 and 76, beyond the core limits, are mutually antiparallel. Besides this, a part of the external electric field, which is generated by each of the cores 18 and 74 gets into the internal region of neighboring to it core (look for example 78). In agreement with the above mentioned reasons, these fields (e.g. 69 and 78, resp.) in contrast to the fields beyond the core limits (e.g. 79) have a positive sign. As a consequence of it, the fields in the internal region of cores become amplified. Because of the mentioned antiparallelity of the fields of both cores 18 and 74 beyond their internal part, the electric fields of both cores become mutually weakened (quenched, look position 79).

The above described mechanism of mutual quenching of electric fields and simultaneously amplification of the internal fields is in the basis of all above described structure versions of the here proposed invention. In a series of structures (e.g. the peripheral monochannel acceleration blocks in structures shown in FIG. 2, FIG. 3, FIG. 9 to FIG. 12) the monochannel blocks are used having the same direction of the magnetic flows in cores. By performing an analogous analysis of any random pair of such monochannel acceleration blocks one can easily reach the conclusion that in the external magnetic field beyond the core limits become mutually amplified whereas the internal electric fields (the fields in the working channels) are mutually quenched.

As an example of the application of the above-described physical idea of compensation of the external electric field, we analyze MLIA, the structure variants of which are presented in FIG. 2 and FIG. 3 and acceleration blocks of which are in FIG. 9 to FIG. 12. Here we have only one basic (central) working channel with the accelerating electric field and a few (in given example 8) peripheral monochannel acceleration blocks having an opposite direction of the electric field in their working channels. Disregarding such asymmetry, such structure efficiently provides the quenching effect for the external fields. This is achieved by the expense of this that the magnetic flow in magnetic cores of each of the peripheral block is weaker (in given case eight times) than in the core of the basic (central) block. Owing to the azimuthal-symetric configuration of the structure, in MLIA, the external field of a single (central) core is compensated by the fields which are generated by eight neighboring with it cores of the peripheral monochannel acceleration blocks.

Figure 29:
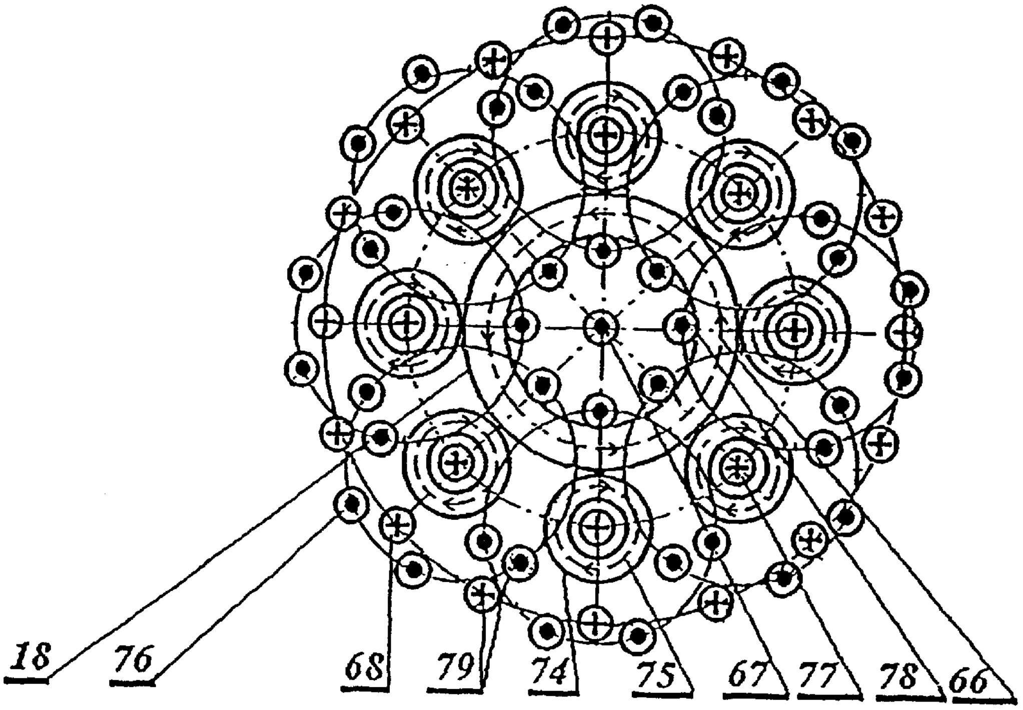
FIG. 29 shows the scheme of the formation of electric and magnetic fields in cylindrical structure, which is shown in FIG. 9 and FIG. 10.
Figure 30:
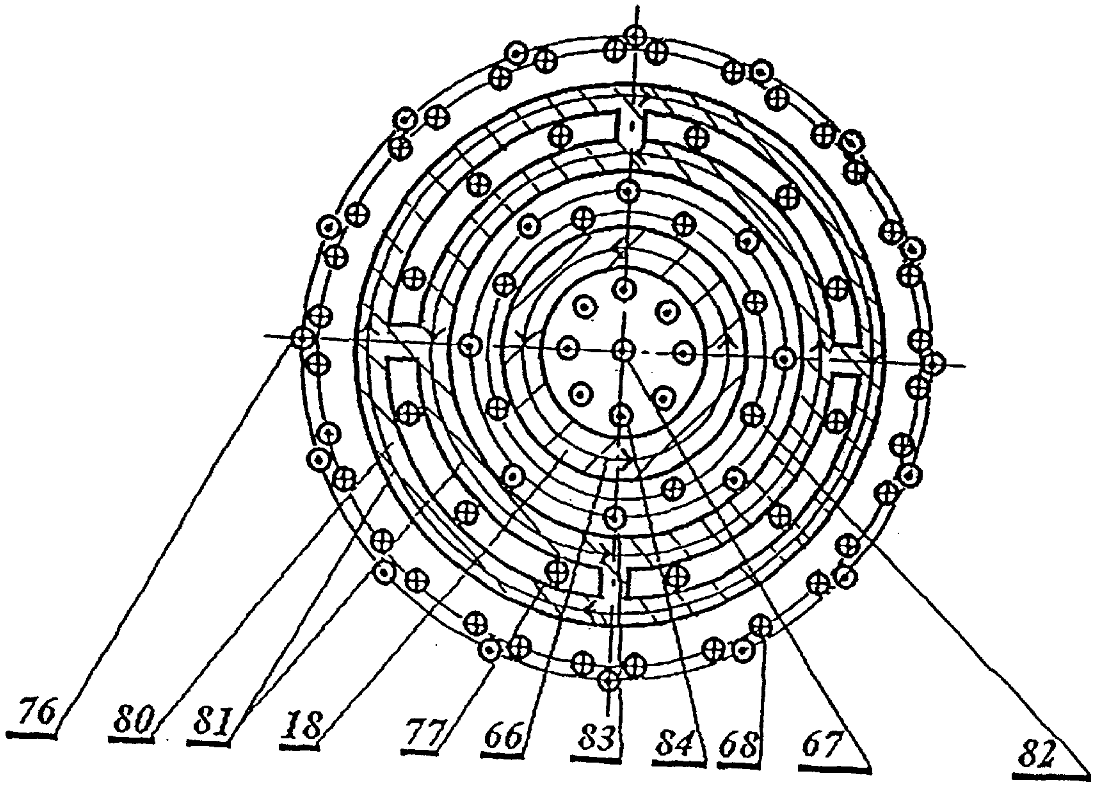
FIG. 30 shows an analogous scheme for a cylindrical structure which is presented in FIG. 11 and FIG. 12.

The above-described physical effect is illustrated in FIG. 29 and FIG. 30. The FIG. 29 shows the scheme of electric and magnetic fields in a cylindrical structure, which is given in FIG. 9 and FIG. 10. The peculiarity of this structure variant is that, as we mentioned before, here we have only one acceleration block SLIA (the central block) with electric field of channel of which (and the acceleration direction) in opposite to the direction of the electric fields in the remaining working channels of SLIA (in the given case, the peripheral). In FIG. 29, the central block is presented by the magnetic core 18 and all the peripheral blocks by magnetic cores 74. The essence of the given structure is that the direction of the magnetic flow circulation 66 in the central monochannel acceleration block in opposite to the direction of the circulation of magnetic-flows 75 in a the peripheral blocks. In such a way, in this structure the direction of the internal electric field 67, which was generated by the central monochannel acceleration block in the working channel, is opposite to the direction of the internal fields 77 in all peripheral working channels. According to the above analysis (look FIG. 28 and corresponding comments) it means that a part of the external fields of the central 68 and the peripheral 76 monochannel acceleration blocks, beyond the limits of their internal regions, is one other mutually quenching (look position 79). Simultaneously, the other part of the external fields 78, which is localized in the internal volume of the working channel of the central monochannel acceleration block, forms with its internal field 67. Because of this, the acting electric field in the working channel is almost stronger than in a single SLIA (see FIG. 25 and FIG. 26). Correspondently, the other part of the external fields 79 of the peripheral and the central blocks, is it was mentioned, quench each other. It is important to mention that the external fields of all peripheral monochannel-accelerating blocks, beyond the limits of their working channels, form a strong collective field, which is quenching isenching the external field 68 of the central monochannel acceleration block.

Simultaneously with this, a part of the external fields of some peripheral blocks, which penetrate into the working channels of other of their neighboring channels, quench the internal fields in these working channels. This was mentioned already before. In contrast to this, a part of the external field of the central block is amplifying the total field in these working channels. Consequently, the electric field in working channels of the peripheral blocks, despite remaining still strong enough, is, however, much weaker than the field in the central working channel.

The scheme of the forming of the electric field in the structure presented in FIG. 11 and FIG. 12, which is shown in FIG. 30, does not differ physically from the above-described scheme. Here, like in the previous case, the magnetic core 18 of the central monochannel acceleration block is made in the cylindrical tube form having a circular cross-section. Herewith, the magnetic cores 80 of the peripheral monochannel acceleration blocks have a groove-like shape. The positions 66 and 81 show the directions of circulation of the magnetic flows in the central and four of the peripheral magnetic cores, respectively. The difference from the previous case (look FIG. 29) is in that that here, owing to the groove-like structure of the latter, their magnetic flows_by merging at contacts form two circular coaxial magnetic flows which flow in mutually opposite directions. The rotation axis of these peripheral flows coincides with the rotation axis of the central magnetic flow 66. Consequently, all the electric vortex fields, which are generated by these flows, are azimuthally uniform. It corresponds to the internal 67 and external 68 and 82 fields of the central magnetic core 18 and also to the internal 77 and external 76 and 83 and 84 fields of the peripheral magnetic cores 80.

It should be mentioned that the efficiency of quenching of the external electric field in presented structure depends essentially on traditional width of the working channel of the groove-like magnetic cores 80. It is explained by this that internal magnetic flow, which flows in it, forms an additional external field, which somehow weakens the external electric field, which is generated by the external magnetic flow. A total quenching of these electric fields does not occur since the distances from the external and the internal magnetic flows to the point of the appearance of the external electric field of MLIA is essentially different. By choosing the radial_width of the working channel of the groove-like magnetic cores 80 and the current strength in the corresponding wire reels, one can achieve practically total compensation of the external electric field of MLIA.

An analogous result can be achieved, in principle, in a case of a multilayer structure of acceleration block, e.g. as illustrated in FIG. 7. The induction accelerator with the acceleration block of such structural version, at specific conditions, can be in principle considered as a partial modification of MLIA. In contrast to the prototype, for this purpose the wire reels of one peripheral (or a few peripheral) coaxial monochannel blocks has to be attached to the drive source in such way that the magnetic flow (magnetic flows) in its core will circulate in the direction opposite to the direction of the central monochannel acceleration block's circulation. In a case of a three-layer version of the given structure variant, the principle of quenching of the external magnetic fields in such MLIA is similar to the above-described quenching principle (see FIG. 30). We stress that technologically the multilayer this type variants have a good perspective. However, the price of its perceptiveness is that, that the resulting collective electric field in the central working channel is somehow weakened by expense of the field, which is generated by the external layer.

Figure 31:
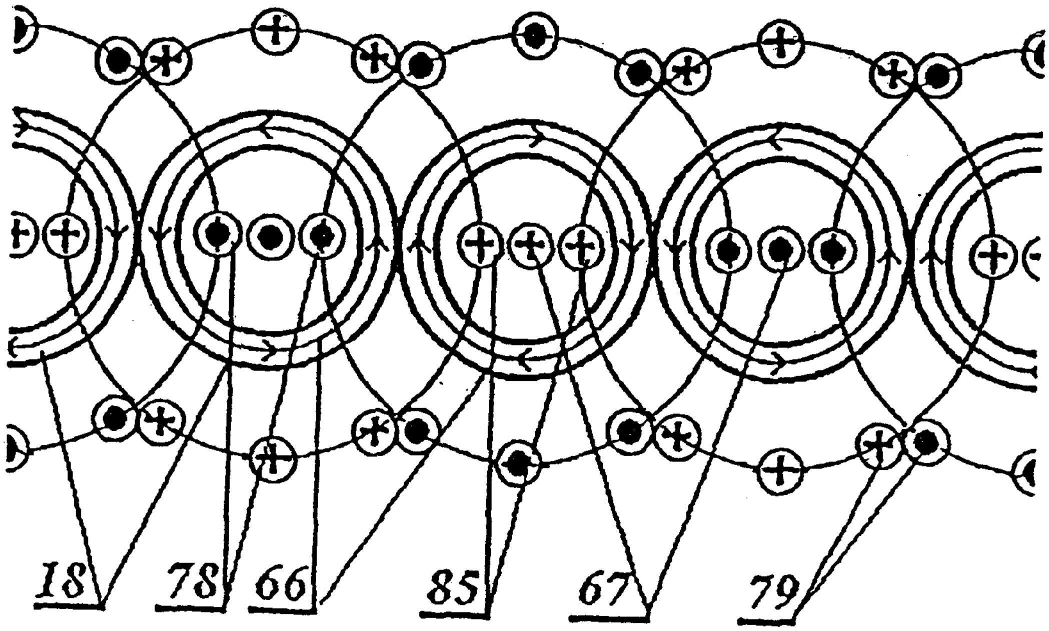
FIG. 31 shows analogous scheme for a planar structure of the multi-channel acceleration block of the type presented in FIG. 15–FIG. 18.

The FIG. 31 illustrates an analogous picture of the formation of the external and the internal fields in planar structures, which are given in FIG. 15 to FIG. 18. As it was mentioned before, these structures belong to the In its essence, this picture represents a subsequent evolution of the scheme, presented in the FIG. 28, in an increase of the number of monochannel blocks. Here, the position 18 represents magnetic cores in volume of which magnetic flows 66 are circulating. The direction of current in wire reels of the monochannel acceleration block are chosen in the way that the magnetic flow 66 in any of the cores circulates in the direction which is opposite to the direction of the magnetic flow circulation in both neighboring to it magnetic cores. It means that the direction vector of the internal electric field 67 in the working channel of any monochannel block is opposite to the direction of such fields in neighboring with it blocks. Therefore, analogously to the previous structure, the external electric fields 79 of all monochannel blocks mutually become quenched 79 beyond the limits of MLIA. Simultaneously to the merging of the part of the external fields 78 and 85 when penetrating into the working channels of neighboring blocks the collective field in the working channels is amplified.

An analogous by its physical nature scheme of the formation of electric fields takes place in the cases of cylindrical (FIG. 13) and planar (FIG. 17) versions of the periodically reverse type structures.

In general, one can formulate a basic principle for this invention, which is enclosed in the formula of the invention. In any of the structural variants at least one of the magnetic flow circulation directions in the magnetic cores has to be opposite to the direction of the direction of magnetic flow circulation in remaining cores.

Figure 32:
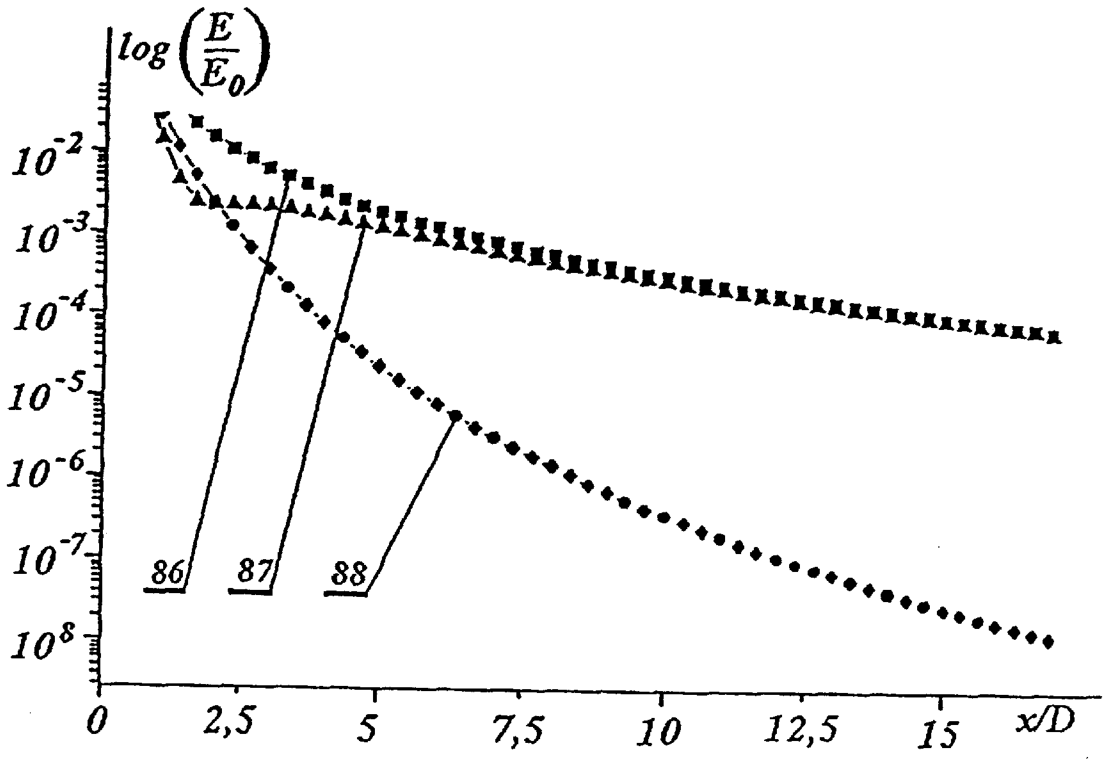
FIG. 32 shows the dependence of the normalized potential of the external vortex electric field on the normalized distances (in the transverse direction) to the transverse surface of acceleration blocks of three types of SLIA, one without screening and two variants of cancellation blocks of MLIA.
Figure 33:
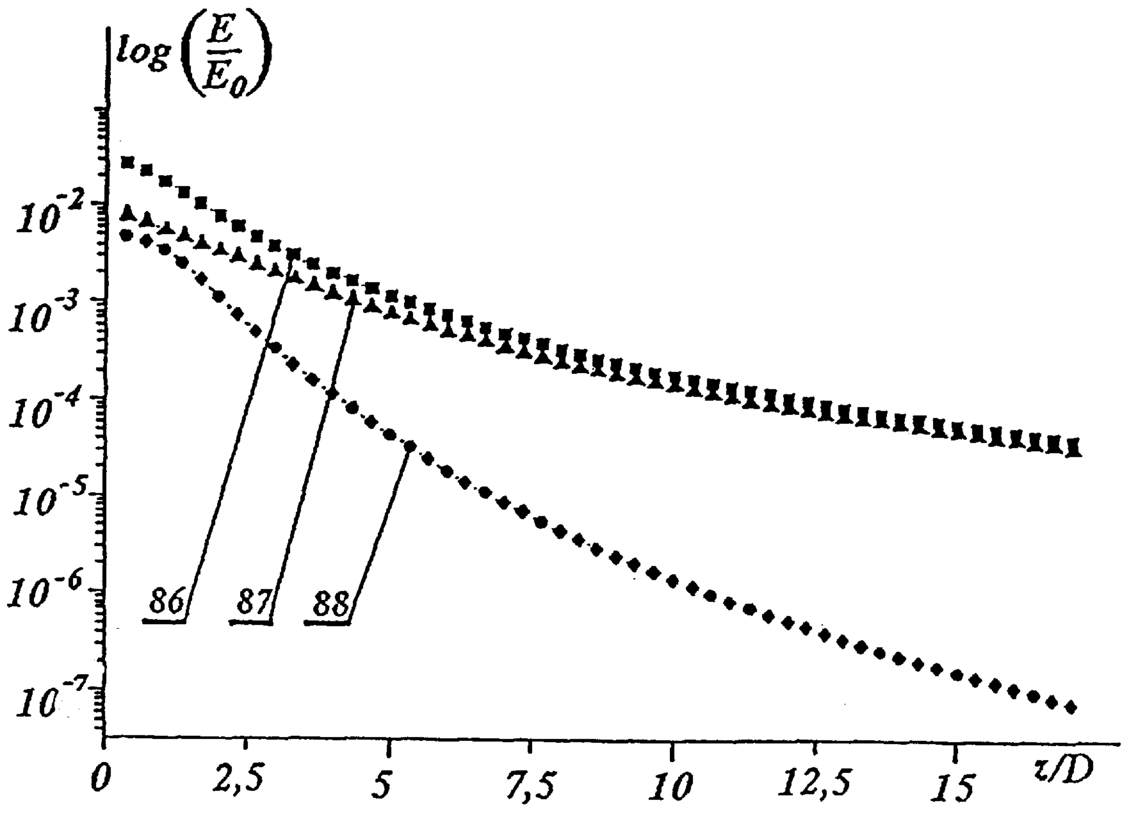
in FIG. 33, the analogous dependence is presented in the longitudinal direction, parallel to the axis.
Figure 34:
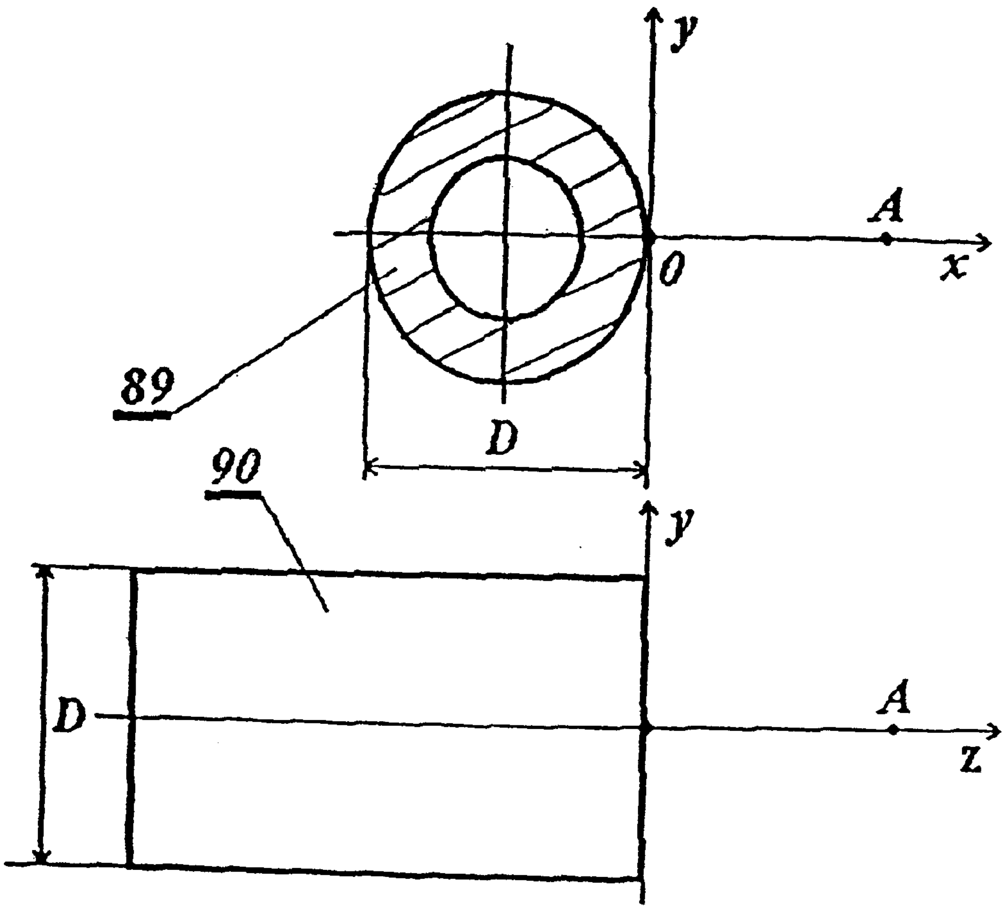
FIG. 34 illustrates the calculated model of SLIA; and in FIG. 35 and FIG. 36 the analogous models are presented of four and nine-channel acceleration blocks, corresponding to the calculations presented in FIG. 32 and FIG. 33.
Figure 35:
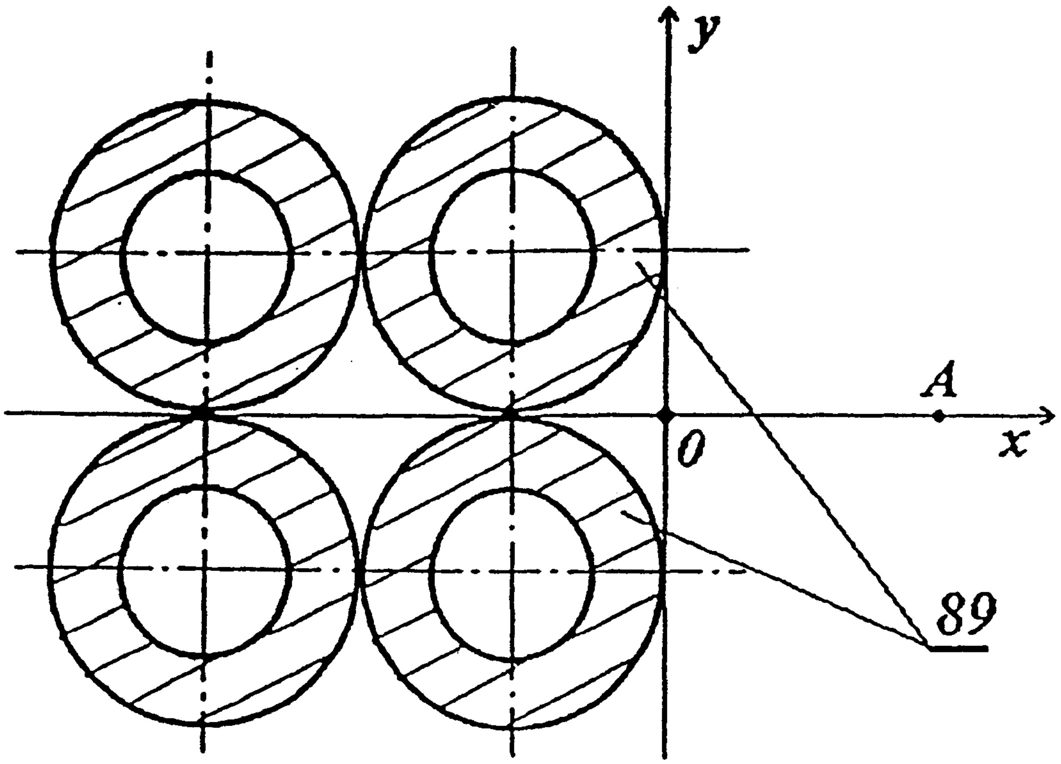
Figure 36:
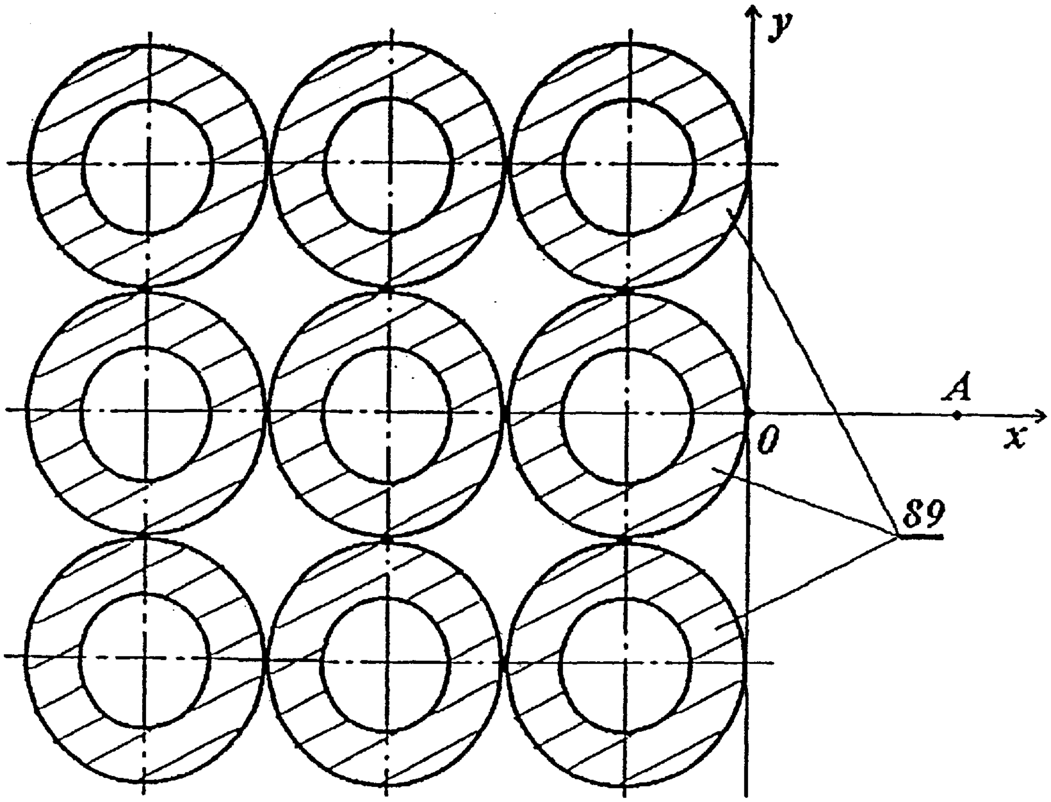

By an analysis of the dependence of the efficiency of quenching (compensation) of the external fields of MLIA it is easy to see that the total number of the acceleration blocks of SLIA, which compose the structure, plays the principal role in it. Should it be even or odd number, especially in a case when all blocks SLIA are identical. This dependence is illustrated by the calculated results that are presented in FIG. 32 to FIG. 36. The FIG. 32 shows the dependence of the logarithm of normalized (on field magnitude in a channel) potential of the external electric field as function of distance from the side surface of MLIA in perpendicular to it direction. In FIG. 32 the analogous dependence is presented only in the longitudinal (parallel to the axis of SLIA blocks) direction. The curves 86, 87 and 88 correspond to three calculation models that differ in the total number of the SLIA blocks. Respectively, the curve corresponds to a case of one isolated block (look the calculation model in FIG. 34), the curve 86 corresponds to a two-layer planar structure which is composed of four equal blocks of SLIA (look the calculated model in FIG. 35), and finally the curve 88 which corresponds to a three-layer planar structure which is composed from nine equal blocks (look the calculated model in FIG. 36). The space point in which the field were calculated in FIG. 34 to FIG. 36 is marked as A, the diameter of a core in marked as D, the normalized distance from the MLIA surface (it means from the surface of the next neighboring core) is marked as x1D or z/D where x and z are the transverse and longitudinal coordinate of the observation point. the position 89 represents the transverse cross-cut of a magnetic core, and the position 90 represents frontal projection of the latter. The $E_0$ describes the potential of the internal electric field in a working channel, and E describes the potential of the external electric field at the observation point A.

The case, which is described by curve 86, corresponds to the prototype structure (Redinato L. "The advanced test accelerator (ATA), a 50-MeV, 19-kA Induction Linac." *IEEE Trans*. NS-30, No 4, pp. 2970–2973, 1983). The curves 87 and 88 describe different partial variants of the proposed invention. A comparison of the curves 86 and 87 (even number of SLIA) demonstrates a high efficiency of the proposed structure even in these structurally most simple situations. Namely, at the distance from the core of approximately 2.5 of core diameter, the external electric field of MLIA is approximately ten times weaker than the electric field near the surface of SLIA. Herewith, at equal currents in reels, electric field in the working channels of MLIA appears approximately 1.8 times stronger. An analogous analysis of the structure, which is shown in FIG. 11 and FIG. 12 reveals that, at a certain choice of parameters, the gain in the weakening magnitude of the external field strength of MLIA can reach approximately $10^3$ to $10^4$ times that of SLIA. An analysis of the curves 88 (odd number of blocks of SLIA) reveals easily that at distances, equal approximately 2 to 3 diameters of core, a system with odd number of SLIA is less efficient than the systems with even number of SLIA. However, they remain more efficient (in quenching of the external electric field) than are the SLIA in their "pure appearance." But at the larger distances the quenching of the external field is weak.

The invention allows using the accelerator as a commercial-type compact accelerator of charged particles, including singular or multiple parallel relativistic beams of charged particles.

Consequently, the proposed linear induction accelerator corresponds to the criterion of patentability in "Industrial Application."

What is claimed is:

1. A multichannel linear induction accelerator, comprising:

a charged particle conveying first channel assembly having a first axis;

a magnetic, particle accelerating first core assembly surmounting at least a portion of said first channel assembly in electrodynamically bound relationship responsive to a first drive source to derive a first electric field of first particle accelerating direction within said first channel assembly, and said first electric field extending externally of said first channel assembly;

an injector assembly configured for introducing charged particles within said first channel assembly;

an output assembly coupled with said first channel assembly and deriving a select accelerated charged particle output;

a second channel assembly having a second axis and located in adjacency with said magnetic particle accelerating first core assembly;

a second core assembly surmounting at least a portion of said second channel assembly in electrodynamically bound relationship and responsive to a second drive source to derive a second electric field of second direction opposite said first direction extending externally of said second channel assembly and located to interact in field diminishing relationship with said first electric field extending externally to said first core assembly; and a source of power generating said first drive source and said second drive source.

2. The multichannel linear induction accelerator of claim 1 in which:

said second channel assembly is a charged particle accelerating second channel assembly;

said injector assembly is configured for introducing charged particles for acceleration within said second channel assembly;

said second core assembly is responsive to said second drive source to effect acceleration of said introduced charged particles within said second channel assembly; and said output assembly is further coupled with said second channel assembly to derive said charged particle output.

3. The multichannel linear induction accelerator of claim 2 in which:

said injector assembly is configured for introducing said charged particles as electrons within said first channel assembly, and is further configured for introducing said charged particles as ions within said second channel assembly.

4. The multichannel linear induction accelerator of claim 3 in which:

said first and second axes of respective said first and second channel assemblies are convergent to effect derivation of a converged particle beam at said output assembly.

5. The multichannel linear induction accelerator of claim 1 in which:

said first and second axes of said first and second channel assemblies are arranged in parallel relationship.

6. The multichannel linear induction accelerator of claim 1 in which:

said second channel assembly is an auxiliary channel assembly comprised of non-magnetic, dielectric material.

7. The multichannel linear induction accelerator of claim 6 in which:

said accelerator further comprises a plurality of said second channel assemblies and operationally associated said second core assemblies and arranged substantially symmetrically about said first channel assembly and said first core assembly, said first and second axes being mutually parallel.

8. The multichannel linear induction accelerator of claim 6 in which:

said first and second axes of respective said first and second channel assemblies are substantially coincident; and said second channel assembly and said second core assembly are located to surmount said first channel assembly and said first core assembly.

9. The multichannel linear induction accelerator of claim 8 in which:

said first channel assembly is configured as a tube having dielectric, non-magnetic walls; and further comprising a metallic screen enclosing said first and second channel assemblies and said first and second core assemblies in spaced adjacency.

10. The multichannel linear induction accelerator of claim 8 in which:

said first channel assembly is configured as a tube having electrically conductive walls which are configured with discontinuous accelerating interspaces in the vicinity of said injector assembly and said output assembly.

11. The multichannel linear induction accelerator of claim 10 further comprising a metallic screen enclosing said first and second channel assemblies and said first and second core assemblies in spaced adjacency.

12. The multichannel linear induction accelerator of claim 6 in which:

said magnetic particle accelerating first core assembly is configured as a mutually spaced apart serially disposed sequence of discrete tube components; and including an inductive winding assembly wound over said sequence of discrete tube components.

13. The multichannel linear induction accelerator of claim 6 in which:

said multichannel linear induction accelerator further comprises a plurality of said first channel assemblies and operationally associated mutually adjacent said first core assemblies the axis of said plurality of first channel assemblies being mutually parallel and arranged along a generally circular locus to define a centrally disposed chamber defining auxiliary region;

said second channel assembly and said second core assembly are disposed within said chamber defining auxiliary region; and said injector assembly is configured for introducing charged particles for acceleration within each of said plurality of said first channel assemblies.

14. The multichannel linear induction accelerator of claim 2 in which:

said first and second axes of respective said first and second channel assemblies are mutually parallel and within a first common plane; and said first and second core assemblies are arranged in mutual adjacency.

15. The multichannel linear induction accelerator of claim 14 in which:

said accelerator further comprises:

charged particle conveying third and fourth channel assemblies having respective third and fourth axes;

magnetic, particle accelerating third and fourth core assemblies surmounting at least a portion of respective said third and fourth channel assemblies in electrodynamically bound relationship, responsive to respective third and fourth drive sources to derive respective third and fourth electric fields of respective third and fourth particle accelerating direction within respective said third and fourth channel assemblies, said third and fourth electric fields extending externally to respective said third and fourth channel assemblies;

said third and fourth axes of respective said third and fourth channel assemblies being mutually parallel and within a second common plane parallel with and spaced from said first common plane;

said source of power generates said third and fourth drive sources; and said injector assembly is configured for introducing charged particles for acceleration within each of said third and fourth channel assemblies.

16. The multichannel linear induction accelerator of claim 6 in which:

said first and second axis of respective said first and second channel assemblies are mutually parallel and within a first common plane;

said first and second core assemblies are arranged in mutual adjacency;

said accelerator further comprises:

a charged particle conveying third channel assembly having a third axis parallel to said first axis;

a magnetic, particle accelerating third core assembly surmounting at least a portion of said third channel assembly in electrodynamically bound relationship, responsive to a third drive source to derive a third electric field of said first particle accelerating direction within said third channel assembly, and said third electric field extending externally of said third channel assembly;

a fourth auxiliary channel assembly comprised of non-magnetic, dielectric material, having a fourth axis parallel with and in a second common plane with said third axis;

a fourth core assembly surmounting at least a portion of said fourth auxiliary channel assembly and responsive to a fourth drive source to derive a fourth electric field of said second direction, extending externally of said fourth channel assembly and located to interact in field diminishing relationship with said third electric field extending externally of said third channel assembly and with said first electric field extending externally of said first channel assembly;

said first and second common planes being mutually parallel, said first core assembly being mutually adjacent to said fourth core assembly, and said second core assembly being mutually adjacent to said third core assembly;

a charged particle conveying fifth channel assembly having a fifth axis parallel with said first axis;

a magnetic, particle accelerating fifth core assembly surmounting at least a portion of said fifth channel assembly in electrodynamically bound relationship, responsive to a fifth drive source to derive a fifth electric field of said first particle accelerating direction within said fifth channel assembly and said fifth electric field extending externally of said fifth channel assembly;

a sixth auxiliary channel assembly comprised of non-magnetic, dielectric material, having a sixth axis parallel with and in a third common plane with said fifth axis;

a sixth core assembly surmounting at least a portion of said sixth auxiliary channel assembly and responsive to a sixth drive source to derive a sixth electric field of said second direction, extending externally of said sixth channel assembly and located to interact in field diminishing relationship with said fifth electric field extending externally of said fifth channel assembly;

a charged particle conveying seventh channel assembly having a seventh axis parallel with said first axis;

a magnetic, particle accelerating seventh core assembly surmounting at least a portion of said seventh channel assembly in electrodynamically bound relationship, responsive to a seventh drive source to derive a seventh electric field of said first particle accelerating direction within said seventh channel assembly and said seventh electric field extending externally of said seventh channel assembly;

an eighth auxiliary channel assembly comprised of non-magnetic, dielectric material, having an eighth axis parallel with and in a fourth common plane with said seventh axis;

an eighth core assembly surmounting at least a portion of said eighth auxiliary channel assembly and responsive to an eighth drive source to derive an eighth electric field of said second direction, extending externally of said eighth channel assembly and located to interact in field diminishing relationship with said seventh electric field extending externally of said seventh channel assembly and said fifth electric field extending externally of said fifth channel assembly;

said third and fourth common planes being mutually parallel, said fifth core assembly being mutually adjacent said sixth core assembly and said eighth core assembly, said seventh core assembly being mutually adjacent said eighth core assembly and said sixth core assembly; and said third common plane being parallel with and spaced from said second common plane to define an intermediate region incorporating a metallic screen.

17. The multichannel linear induction accelerator of claim 1 in which:

said second core assembly further comprises integrally formed paired electrically conductive walls spaced apart to define a cavity; and said second channel assembly is an auxiliary channel extending within said cavity.

18. The multichannel linear induction accelerator of claim 17 in which:

said second channel assembly comprises a non-magnetic, dielectric material.

* * * * *